United States Patent
Chen et al.

(10) Patent No.: US 10,791,546 B2
(45) Date of Patent: Sep. 29, 2020

(54) PUCCH FOR MTC DEVICES

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 14/926,630

(22) Filed: Oct. 29, 2015

(65) Prior Publication Data

US 2016/0135170 A1 May 12, 2016

Related U.S. Application Data

(60) Provisional application No. 62/077,064, filed on Nov. 7, 2014.

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1861* (2013.01); *H04L 5/0055* (2013.01);
(Continued)

(58) Field of Classification Search
USPC ........................................................ 370/336
See application file for complete search history.

(56) References Cited

U.S. PATENT DOCUMENTS 9,282,567 B2 * 3/2016 Golitschek Edler Von Elbwart ............... H04B 7/2656
9,635,644 B2 * 4/2017 Chen ..................... H04W 72/04
(Continued)

FOREIGN PATENT DOCUMENTS

CN 101651601 A 2/2010
EP 2744122 A2 6/2014
(Continued)

OTHER PUBLICATIONS

U.S. Appl. No. 61/933,300, filed Jan. 29, 2014 (Year: 2014).*
(Continued)

*Primary Examiner* — Gregory B Sefcheck
*Assistant Examiner* — Majid Esmaeilian
(74) *Attorney, Agent, or Firm* — Holland & Hart LLP/QUALCOMM Incorporated

(57) ABSTRACT

Methods, systems, and devices are described for wireless communication at a device. A wireless device may be configured with a transmission time interval (TTI) bundling parameter. The device may then identify one or more resources for an uplink (UL) control channel based on the TTI bundling parameter (e.g., using either an implicit or an explicit indication from another wireless node such as a serving cell of a base station) and transmit the UL control channel using the identified resources. The device may also identify a downlink control information (DCI) format based on the TTI bundling parameter. For example, a resource allocation granularity level may be associated with the bundling parameter, and the length of a DCI field may depend on the resource allocation granularity level.

28 Claims, 16 Drawing Sheets

(51) Int. Cl.
*H04W 4/70* (2018.01)
*H04L 5/14* (2006.01)
*H04L 5/00* (2006.01)

(52) U.S. Cl.
CPC .......... *H04L 5/0082* (2013.01); *H04L 5/0091* (2013.01); *H04W 72/042* (2013.01); *H04W 72/0446* (2013.01); *H04L 5/001* (2013.01); *H04L 5/0023* (2013.01); *H04L 5/14* (2013.01); *H04W 4/70* (2018.02)

(56) References Cited

U.S. PATENT DOCUMENTS

| | | | |
|---|---|---|---|
| 9,655,088 B2 | 5/2017 | Xu et al. | |
| 9,843,429 B2* | 12/2017 | Yi | H04W 4/70 |
| 2009/0257408 A1* | 10/2009 | Zhang | H04L 1/1621 |
| | | | 370/336 |
| 2009/0307554 A1* | 12/2009 | Marinier | H04L 1/1812 |
| | | | 714/748 |
| 2013/0242889 A1* | 9/2013 | Khoryaev | H04W 72/0413 |
| | | | 370/329 |
| 2013/0250869 A1* | 9/2013 | Eriksson | H04W 72/1231 |
| | | | 370/329 |
| 2013/0250924 A1* | 9/2013 | Chen | H04L 1/1819 |
| | | | 370/336 |
| 2014/0086220 A1* | 3/2014 | Shi | H04L 5/0082 |
| | | | 370/336 |
| 2014/0146763 A1* | 5/2014 | Khay-Ibbat | H04W 72/1236 |
| | | | 370/329 |
| 2015/0029951 A1* | 1/2015 | Sano | H04W 16/28 |
| | | | 370/329 |
| 2015/0181576 A1* | 6/2015 | Papasakellariou | H04L 5/0053 |
| | | | 370/329 |
| 2016/0164643 A1* | 6/2016 | Loehr | H04L 1/1854 |
| | | | 370/336 |
| 2016/0353440 A1* | 12/2016 | Lee | H04W 4/70 |
| 2017/0265174 A1* | 9/2017 | Wang | H04L 1/08 |
| 2017/0303248 A1* | 10/2017 | Chatterjee | H04W 72/0446 |
| 2017/0317808 A1* | 11/2017 | You | H04L 5/0055 |

FOREIGN PATENT DOCUMENTS

| | | |
|---|---|---|
| WO | WO-2013127634 A1 | 9/2013 |
| WO | WO-2014055878 A1 | 4/2014 |

OTHER PUBLICATIONS

U.S. Appl. No. 61/955,655, filed Mar. 19, 2014 (Year: 2014).*
U.S. Appl. No. 62/075,630, filed Nov. 5, 2014 (Year: 2014).*
ISA/EPO, International Search Report and Written Opinion of the International Searching Authority, Int'l. App. No. PCT/US2015/058292, dated Feb. 8, 2016, European Patent Office, Rijswijk, NL, 13 pgs.
Mediatek Inc., "Coverage Analysis of Downlonk Control Channel and Enhancement Techniques for MTC UEs," 3GPP TSG-RAN WG1 #72bis, R1-131182, Chicago, USA, Apr. 14-19, 2013, 6 pgs., 3rd Generation Partnership Project.
CATT: "TTI bundling Configuration", 3GPP Draft; R2-082317 TTI Bundling Configuration, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; Apr. 29, 2008, Apr. 29, 2008 (Apr. 29, 2008), XP050140061, [retrieved on Apr. 29, 2008].
Intel Corporation: "Coverage enhancement of DU/UL Control Channels for Low Cost MTC", 3GPP Draft; R1-135105 Intel-MTC Control Channels, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 11, 2013-Nov. 15, 2013 Nov. 13, 2013, XP050734807, Retrieved from the Internet: URL:http://www.3gpp.org/ftp/Meetings_3GPP_SYNC/RAN/RAN1/Docs/ [retrieved on Nov. 13, 2013], 10 pages.
ZTE: "Discussion on Control Channel Coverage Improvement", 3GPP Draft; R1-135360 Control, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 11, 2013-Nov. 15, 2013 Nov. 13, 2013, XP050735043, Retrieved from the Internet: URL:http://www.3gpp.org/ftp/Meetings_3GPP_SYNC/RAN/RAN1/Docs/ [retrieved on Nov. 13, 2013], 6 pages.

* cited by examiner

PUCCH FOR MTC DEVICES

CROSS REFERENCES

The present Application for Patent claims priority to U.S. Provisional Patent Application No. 62/077,064 by Chen et al., entitled "PUCCH for MTC Devices," filed Nov. 7, 2014, assigned to the assignee hereof, and expressly incorporated by reference herein.

BACKGROUND

Field of Disclosure

The following relates generally to wireless communication, and more specifically to a physical uplink control channel (PUCCH) for machine type communication (MTC) devices.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some cases, different UEs may have different wireless link configurations such as different transmission time interval (TTI) bundling configurations. For example, some types of UEs may designed for automated communication. Automated wireless devices may include those implementing Machine-to-Machine (M2M) communication or Machine Type Communication (MTC), i.e., communication without human intervention. MTC devices and other UEs may implement coverage enhancement operations that include higher levels of repetition or lower modulation and coding (MCS) rates, which may be associated with a number of bundled TTIs for each DL or UL transmission. In some cases, different TTI bundling configurations may result in collisions of UL control transmissions.

SUMMARY

The present disclosure may relate generally to wireless communications systems, and more particularly to improved systems, methods, or apparatuses for PUCCH with MTC devices. A wireless device may be configured with a transmission time interval (TTI) bundling parameter. The device may then identify one or more resources for an uplink (UL) control channel based on the TTI bundling parameter (e.g., using either an implicit or an explicit indication from another wireless node such as a serving cell of a base station) and transmit the UL control channel using the identified resources. The device may also identify a downlink control information (DCI) format based on the TTI bundling parameter. For example, a resource allocation granularity level may be associated with the bundling parameter, and the length of a DCI field may depend on the resource allocation granularity level.

A method of wireless communication at a wireless device is described. The method may include identifying a TTI bundling parameter of an UL control channel, and identifying one or more resources for the UL control channel based at least in part on the TTI bundling parameter.

An apparatus for wireless communication at a wireless device is described. The apparatus may include means for identifying a TTI bundling parameter of an UL control channel, and means for identifying one or more resources for the UL control channel based at least in part on the TTI bundling parameter.

A further apparatus for wireless communication at a wireless device is described. The apparatus may include a processor, memory in electronic communication with the processor, and instructions stored in the memory, wherein the instructions are executable by the processor to identify a TTI bundling parameter of an UL control channel, and identify one or more resources for an UL control channel based at least in part on the TTI bundling parameter.

A non-transitory computer-readable medium storing code for wireless communication at a wireless device is described. The code may include instructions executable to identify a TTI bundling parameter of an UL control channel, and identify one or more resources for an UL control channel based at least in part on the TTI bundling parameter.

Some examples of the method, apparatuses, or non-transitory computer-readable medium described above may further include features, means, or instructions for transmitting the UL control channel using the one or more resources. Additionally or alternatively, some examples may include receiving the UL control channel using the one or more resources.

In some examples of the method, apparatuses, or non-transitory computer-readable medium described above, identifying the one or more resources comprises identifying the one or more resources based on an implicit resource allocation. Additionally or alternatively, in some examples the implicit resource allocation is based at least in part on at least one of a physical downlink control channel (PDCCH) resource or a physical downlink shared channel (PDSCH) resource.

In some examples of the method, apparatuses, or non-transitory computer-readable medium described above, identifying the one or more resources comprises identifying the one or more resources based at least in part on a correspondence between a set of frequency ranges of a carrier bandwidth of a serving cell and a set of TTI bundling parameters, wherein the set of TTI bundling parameters comprises the TTI bundling parameter of the UL control channel. Additionally or alternatively, some examples may include determining a correspondence between a set of resource offsets and a set of TTI bundling parameters, wherein the set of TTI bundling parameters comprises the TTI bundling parameter of the UL control channel.

In some examples of the method, apparatuses, or non-transitory computer-readable medium described above, identifying the one or more resources comprises selecting a resource offset from the set of resource offsets based at least in part on the TTI bundling parameter and the correspondence. Additionally or alternatively, some examples may include receiving a configuration indicating a resource offset corresponding to the TTI bundling parameter, wherein identifying the one or more resources is based on the resource offset.

In some examples of the method, apparatuses, or non-transitory computer-readable medium described above, identifying the one or more resources comprises receiving an indication of the one or more resources from a wireless node. Additionally or alternatively, some examples may include receiving a configuration of a plurality of resources for the TTI bundling parameter, receiving an indication in a DL control channel, and identifying one resource from the configured plurality of resources for the TTI bundling parameter based on the indication.

In some examples of the method, apparatuses, or non-transitory computer-readable medium described above, identifying the one or more resources comprises identifying a resource hopping pattern for a bundled transmission over a plurality of subframes in a resource block. Additionally or alternatively, in some examples the TTI bundling parameter is based at least in part on a coverage enhancement setting of the wireless device.

In some examples of the method, apparatuses, or non-transitory computer-readable medium described above, the wireless device is an MTC device.

A method of wireless communication at a wireless device is described. The method may include identifying a TTI bundling parameter of an UL control channel, and identifying a DCI format based at least in part on the TTI bundling parameter.

An apparatus for wireless communication at a wireless device is described. The apparatus may include means for identifying a TTI bundling parameter of an UL control channel, and means for identifying a DCI format based at least in part on the TTI bundling parameter.

A further apparatus for wireless communication at a wireless device is described. The apparatus may include a processor, memory in electronic communication with the processor, and instructions stored in the memory, wherein the instructions are executable by the processor to identify a TTI bundling parameter of an UL control channel, and identify a DCI format based at least in part on the TTI bundling parameter.

A non-transitory computer-readable medium storing code for wireless communication at a wireless device is described. The code may include instructions executable to identify a TTI bundling parameter of an UL control channel, and identify a DCI format based at least in part on the TTI bundling parameter.

Some examples of the method, apparatuses, or non-transitory computer-readable medium described above may further include features, means, or instructions for receiving a DL control channel based at least in part on the DCI format. Additionally or alternatively, some examples may include transmitting a DL control channel based at least in part on the DCI format.

In some examples of the method, apparatuses, or non-transitory computer-readable medium described above, the TTI bundling parameter corresponds to a resource allocation granularity level, wherein the DCI format is based at least in part on the resource allocation granularity level. Additionally or alternatively, in some examples the resource allocation granularity level is based on a minimum of a plurality of resource block (RBs), wherein a DCI field indicating a set of resources for an UL control channel comprises a number bits based on the resource allocation granularity level.

In some examples of the method, apparatuses, or non-transitory computer-readable medium described above, the resource allocation granularity level is based on a minimum of 1 RB, wherein a DCI field indicating a set of resources for an UL control channel comprises a number of bits based on the resource allocation granularity level. Additionally or alternatively, in some examples the TTI bundling parameter corresponds to an MCS information field, wherein the DCI format is based at least in part on the MCS information field.

Some examples of the method, apparatuses, or non-transitory computer-readable medium described above may further include features, means, or instructions for determining a first TTI bundling length, determining a first length of the MCS information field based on the first TTI bundling length, determining a second TTI bundling length, where the second TTI bundling length is larger than the first TTI bundling length, and determining a second length of the MCS information field based on the second TTI bundling length, where the second length of the MCS information field is smaller than the first length of the MCS information field.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
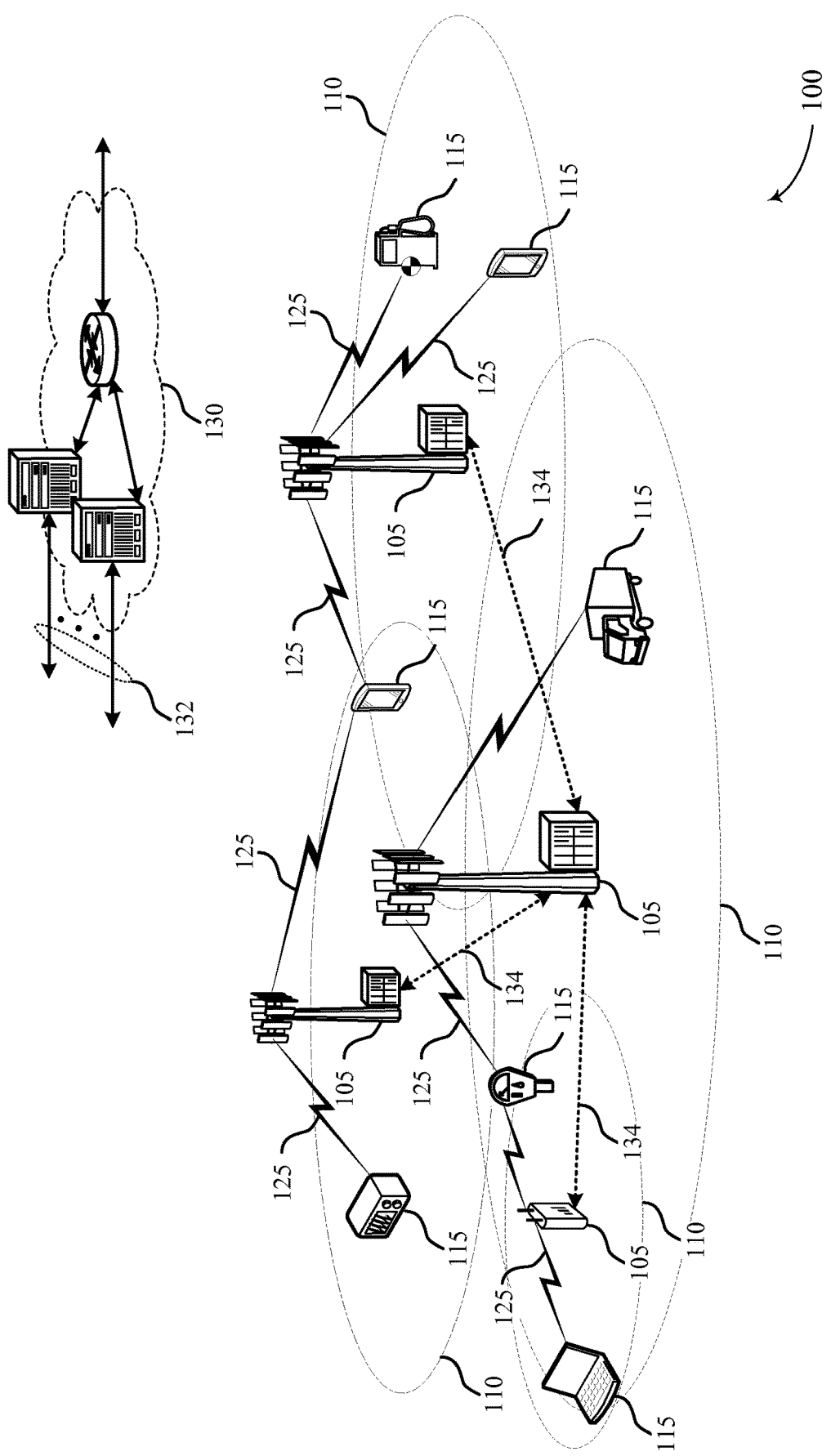
FIG. 1 illustrates an example of a wireless communications system for physical uplink control channel (PUCCH) with machine type communication (MTC) devices in accordance with various aspects of the present disclosure.

The described features generally relate to improved systems, methods, or apparatuses for a physical uplink (UL) control channel (PUCCH) with Machine Type Communication (MTC) devices. Some wireless systems may provide for automated communication such as MTC or Machine-to-Machine (M2M) communication. M2M or MTC may refer to technologies that communicate without human intervention. In some cases, MTC devices may have limited capabilities. For example, while some MTC devices may have broadband capacity, other MTC devices may be limited to narrowband communications. This narrowband limitation may, for example, interfere with the ability of an MTC device to receive control channel information using the full bandwidth served by a base station. In some wireless communication systems, such as Long Term Evolution (LTE), an MTC device having limited bandwidth capability (or another device with similar capabilities) may be referred to as a category 0 device.

In some cases, MTC devices may have reduced peak data rates (e.g., a maximum transport block size may be 1000 bits). Additionally, an MTC device may have rank 1 transmission and one antenna for receiving. This may limit an MTC device to half-duplex communication (i.e., the device may not be capable of simultaneously transmitting and receiving). If an MTC device is half-duplex, it may have relaxed switching time (e.g., from transmission (Tx) to reception (Rx) or vice versa). For example, a nominal switching time for a non-MTC device may be 20 µs while a switching time for an MTC device may be 1 ms. MTC enhancements (eMTC) in a wireless system may allow narrowband MTC devices to effectively operate within wider system bandwidth operations (e.g., 1.4/3/5/10/15/20 MHz). For example, an MTC device may support 1.4 MHz bandwidth (i.e., 6 resources blocks). In some instances, coverage enhancements of such MTC devices may be achieved by power boosting of (e.g., of up to 15 dB).

MTC devices may be subject to different degrees of coverage enhancements based on various factors including traffic type, location, and interference. For instance, some MTC devices may find that using little to no coverage enhancements is sufficient for their applications and/or communication environment. However, other MTC devices within the same coverage area may find the same level of coverage enhancements insufficient. Thus, a base station such as an evolved node B (eNB) may provide and handle different levels of coverage enhancements for different MTC devices, which may introduce resource management issues and place a processing/scheduling burden on the system.

For MTC devices without coverage enhancements, an eNB may use implicit physical UL control channel (PUCCH) resource allocation. However, there may be more control channel elements (CCEs) than resource blocks (RBs), which may create an unnecessarily large number of PUCCH resources (e.g., if the implicit resource allocation is based on a starting CCE). Thus, the resource allocation may be based on physical downlink shared control channel (PDSCH) resources instead of PDCCH resource (e.g., the starting RB of PDSCH may be used to derive the PUCCH resource for acknowledgement/negative acknowledgement (ACK/NACK) feedback). If multiple antenna configurations are not supported, there may be up to 6 1-RB PDSCH assignments for MTC devices (i.e., up to 6 implicit PUCCH resources). In such cases, the MTC devices may use mirror hopping of PUCCH over slots, which may improve frequency diversity gain.

For MTC devices with coverage enhancements, PUCCH resource allocation may be done implicitly or explicitly. If the resource allocation is done implicitly, an eNB may allocate resources separately for MTC devices with different levels of coverage enhancements. For instance, an eNB may apply different resource starting offsets to different MTC devices, according the coverage of the MTC devices (e.g., an MTC device without coverage enhancements may be configured with a first PUCCH resource starting offset; an MTC device with low coverage enhancements may be configured with a second PUCCH resource offset; an MTC device with medium coverage enhancements may be configured with a third PUCCH resource offset; and an MTC device with large coverage enhancements may be configured with a fourth PUCCH resource offset).

The implicit resource allocation may be based on a PDCCH resource or a PDSCH resource (e.g., the PDCCH resource in the first or the last subframe in a PDCCH bundle; or the PDSCH resource in the first or the last subframe in a PDSCH bundle). For explicit resource allocation, an MTC device may be configured with explicit resources for transmissions under coverage enhancements. The configuration may be done separately for different MTC devices, according to the different coverage enhancement levels of the MTC devices. The configuration may also be done separately for different coverage enhancement levels of a single MTC device if the MTC device is configured with more than one coverage enhancement level. The number of explicit resources for a given coverage enhancement level may be one or more. If more than one resource is configured, a control channel may indicate to an MTC device which resource to use.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other type of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

Some types of wireless devices may provide for automated communication. Automated wireless devices may include those implementing MTC or M2M communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. In some cases, MTC devices may be configured for regular transmission intervals that alternate with sleep intervals.

The communication links 125 shown in wireless communications system 100 may include uplink UL transmissions from a UE 115 to a base station 105, or downlink (DL) transmissions, from a base station 105 to a UE 115. The downlink transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more UL CCs for carrier aggregation. Carrier aggregation may be used with both FDD and TDD component carriers.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Time intervals in LTE may be expressed in multiples of a basic time unit (e.g., the sampling period, Ts=1/30,720,000 seconds). Time resources may be organized according to radio frames of length of 10 ms (Tf=307200·Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

A resource element may consist of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS) and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be for the UE.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and UL shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, PUCCH for control data, and physical UL shared channel (PUSCH) for user data.

PUCCH may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through RRC signaling. In some cases, resources for SR may be assigned after acquiring synchronization through a RACH procedure. In other cases, an SR may not be assigned to a UE 115 through the RACH (i.e., synchronized UEs 115 may or may not have a dedicated SR channel). PUCCH resources for SR and CQI may be lost when the UE is no longer synchronized.

HARQ transmissions (e.g., on PUCCH) may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information.

In some cases a TTI (e.g., 1 ms in LTE, the equivalent of one subframe) may be defined as the smallest unit of time in which a base station 105 may schedule a UE 115 for UL or DL transmission. For example, if a UE 115 is receiving DL data, then during each 1 ms interval a base station 105 may assign resources and indicate (via PDCCH transmissions) to the UE 115 where to look for its DL data. If a transmission is unsuccessful, a UE 115 (or a base station 105) may respond with a NACK in accordance with a HARQ procedure. In some cases, HARQ procedures may result in multiple retransmissions of data, which may result in delays and an impaired user experience. The degradation in service may be particularly significant in poor radio conditions (e.g., near the edge of a cell). The degradation may not be acceptable for certain time-sensitive user services such as voice over internet protocol (VoIP) (or voice over Long Term evolution (VoLTE)). TTI bundling may be used to improve a wireless communication link 125 in such radio conditions. TTI bundling may involve sending multiple copies of the same information in a group of consecutive or non-consecutive subframes (TTIs) rather than waiting for a NACK before retransmitting redundancy versions as in typical HARQ operation.

According to the present disclosure, a wireless device such as a UE 115 may be configured with a transmission time interval (TTI) bundling parameter. The device may then identify one or more resources for PUCCH based on the TTI bundling parameter (e.g., using either an implicit or an explicit indication from another wireless node such as a serving cell of a base station 105) and transmit the PUCCH using the identified resources. The device may also identify a DCI format based on the TTI bundling parameter. For example, a resource allocation granularity level may be associated with the bundling parameter, and the length of a DCI field may depend on the resource allocation granularity level.

Figure 2:
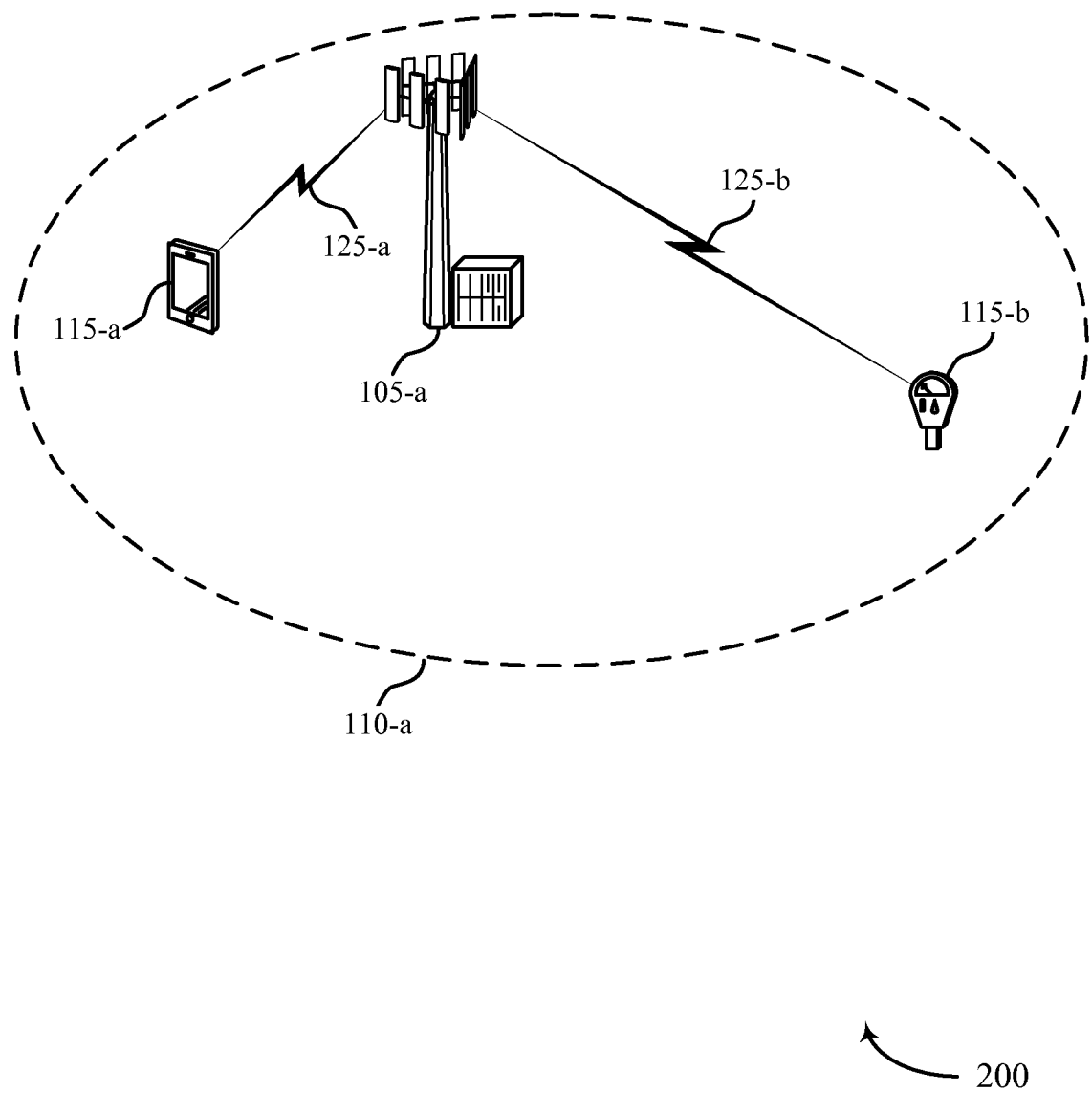
FIG. 2 illustrates an example of a wireless communications subsystem for PUCCH with MTC devices in accordance with various aspects of the present disclosure.

FIG. 2 illustrates an example of a wireless communications subsystem 200 for PUCCH with MTC devices in accordance with various aspects of the present disclosure. Wireless communications subsystem 200 may include UE 115-*a* and UE 115-*b*, which may be examples of a UE 115 described with reference to FIG. 1. In some examples, one or more of the UEs 115 may be an MTC device. For example, as illustrated, UE 115-*b* may be an MTC device. Wireless communications subsystem 200 may also include base station 105-*a*, which may be an example of a base station 105 described above with reference to FIG. 1. Base station 105-*a* may transmit control and data to any UE 115 within its coverage area 110-*a* via a communication link 125. For example, communication link 125-*a* may allow for bidirectional communication between a UE 115-*a* and a base station 105-*a*, while communication link 125-*b* may provide for communication between UE 115-*b* and base station 105-*a*.

Wireless communications subsystem 200 may employ a hybrid automatic repeat request (HARQ) feedback scheme to notify a transmitting entity (e.g., base station 105-*a*) of the reception status of transmitted subframes. Wireless communications subsystem 200 may also use coverage enhancements techniques (e.g., power boosting or TTI bundling), which may increase the robustness and reliability of communications for one or more UEs 115.

Wireless communications subsystem 200 may include UEs 115 with different capabilities and different communication environments. In some cases, a UE 115 may also be configured with two or more levels of TTI bundling or other coverage enhancements. In such cases, different UEs 115 may use different levels of TTI bundling or other coverage enhancements. For example, UE 115-*a* may be located closer to base station 105-*a* and may have different radio capacity than UE 115-*b*, which may be an MTC device. UE 115-*b* may have a longer transmit path than UE 115-*a*, which may increase the level of signal attenuation or interference. Thus, UE 115-*b* may use a coverage enhancement level which differs from a coverage enhancement level used by UE 115-*a*. In some cases, base station 105-*a* may configure UE 115-*b* with a different TTI bundling configuration from UE 115-*a* (e.g., a higher level of TTI bundling). In some cases resources for PUCCH transmissions may be offset from DL transmissions by a number of subframes based on the type/level of TTI bundling used by each UE 115 (in addition to other factors). This may allow base station 105-*a* to prevent collisions of PUCCH transmissions (e.g., HARQ feedback) from UE 115-*a* and UE 115-*b*.

UEs 115 which employ different levels of TTI bundling may also be allocated different granularity levels for resource allocation (e.g., resources may be allocated for a UE 115 in sets of 1, 3 or 6 RBs). The allocated RBs may be contiguous in the frequency domain. For example, if transmissions to UE 115-*b* are provided in 6 RB segments in the frequency domain, it may enable the same amount of information to be transmitted in a shorter time period. The duration of a transmission may be inversely correlated to the power consumption. Thus, allocating more RBs spread across the frequency domain may reduce power consumption. Increasing the resource allocation granularity may also enable base station 105-*a* (or another wireless device) to reduce the number of bits for indicating which RBs are directed to UE 115-*b*. Thus, in some examples, different DCI formats may be used for UEs 115 which employ different levels of coverage enhancements.

In some cases, PUCCH resource hopping within a subframe and/or across subframes may also be employed. However, the hopped resources may be within the same RB within a subframe across subframes to enable coherent channel estimate (i.e., the resources may be hopped within the same RB, but with different cyclic shifts or spreading codes). As an example, assume a PUCCH has a bundling length of two subframes. The PUCCH may use RB0 in a first slot in the first subframe and RB5 in a second slot of in the first frame. The PUCCH will still use RB0 in a first lot in the second subframe and RB5 in a second slot in the second frame, although the resources in RB0 (or RB5) for the first subframe and the second subframe can be different. As another example, assume a PUCCH has a bundling length of two subframes. The PUCCH may use RB0 in a first slot in the first subframe and RB0 in a second slot of in the first frame, although the resources in RB0 can be different in the first slot and in the second slot. The PUCCH will still use RB0 in a first slot in the second subframe and RB0 in a second slot in the second frame, although the resources in RB0 for the first subframe and the second subframe can be different. Similarly, resource hopping may be enabled for other channels, such as PDSCH, PUSCH, etc. For an UE 115, such as an MTC device, which uses PUCCH mirror hopping and one RB for PUCCH, the remaining resources may be used by the PUSCH (i.e., the remaining 5 RBs from the central 6 RBs of the carrier bandwidth in the case that the device monitors on those RBs). For example, if one RB is designated for PUCCH mirror hopping, and if PUSCH is allocated on the RB, the PUSCH may rate match around the PUCCH.

Figure 3:
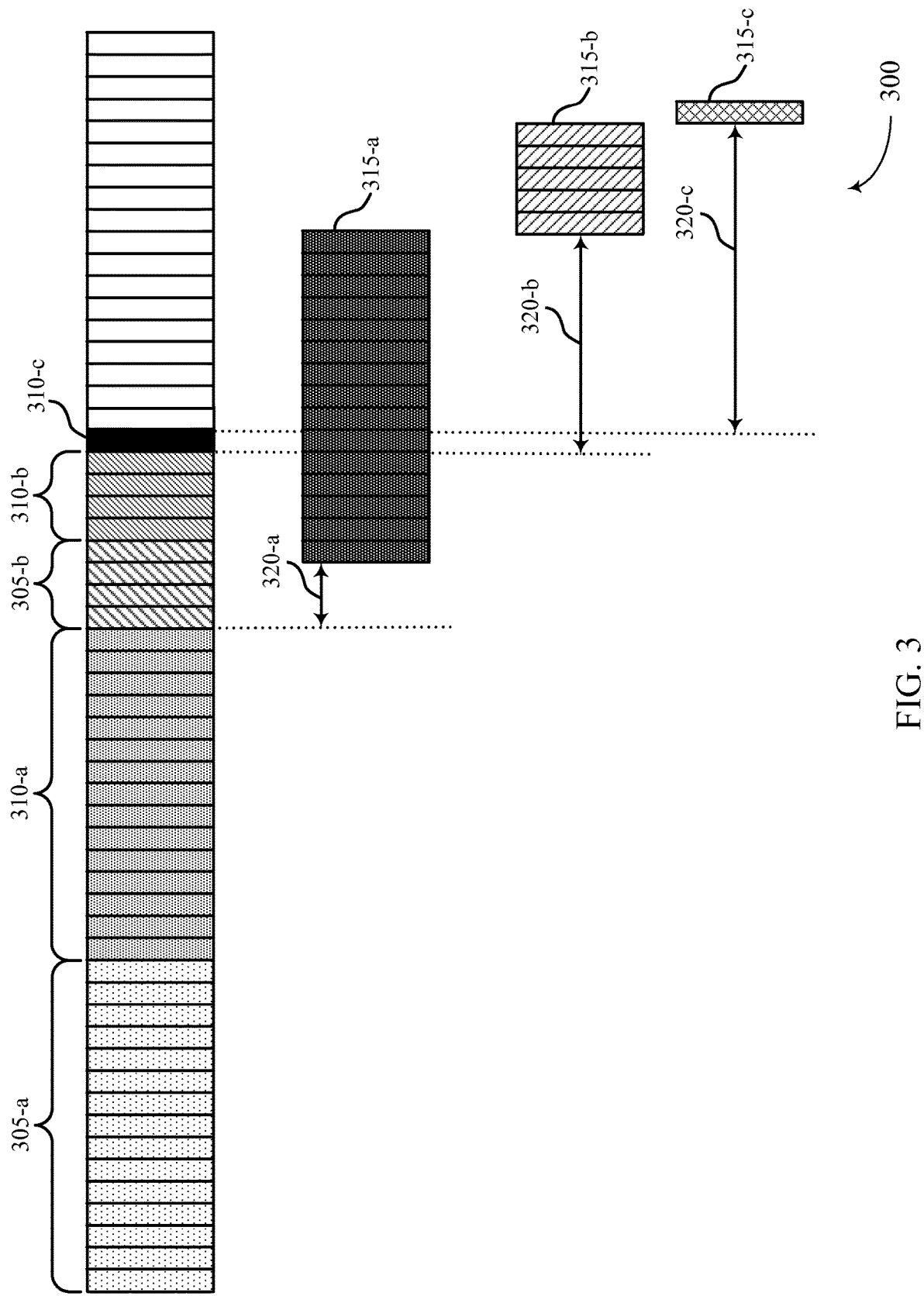
FIG. 3 illustrates an example of a resource offset configuration for PUCCH with MTC devices in accordance with various aspects of the present disclosure.

FIG. 3 illustrates an example of resource offset configuration 300 in accordance with various aspects of the present disclosure. Resource offset configuration 300 may be used by a UE 115 and a base station 105 as described with reference to FIGS. 1-2. Resource offset configuration 300 may include transmission of DL control TTI bundles 305, DL data TTI bundles 310, and PUCCH bundles 315, which may be scheduled to prevent or alleviate collision of PUCCH transmissions from different UEs 115.

Resource offset configuration 300 may include a DL control TTI bundle 305-a from a wireless node such as a base station 105 to a first UE 115 (not shown). DL control TTI bundle 305-a may include fifteen versions of the same subframe (i.e., DL control TTI bundle 305-a may be a transmission with a first level of TTI bundling), which may convey control information for the first UE 115. Immediately subsequent to the transmission of DL control TTI bundle 305-a, the base station 105 may transmit DL data TTI bundle 310-a. DL data TTI 310-a may use the same TTI bundling level as DL control TTI bundle 305-a, and may include redundant versions of a subframe carrying data for the first UE 115. The first UE 115 may receive DL data TTI 310-a and transmit a PUCCH bundle 315-a according to resource offset 320-a. Resource offset 320-a may be based on the TTI bundling of the first UE 115 or on other factors such as the resource offset of other UEs 115 scheduled by the same node.

Resource offset configuration 300 may include a DL control TTI bundle 305-b from the wireless node to a second UE 115 (not shown). DL control TTI bundle 305-b may use a different level of TTI bundling than DL control TTI bundle 305-b (e.g., DL control TTI bundle 305-b may include 4 redundant versions of a same subframe). Following DL control TTI bundle 305-b, the base station 105 may transmit DL data TTI bundle 310-b, which may correspond to DL control TTI bundle 305-b and thus use the same TTI bundling. The second UE 115 may receive DL data TTI bundle 310-b and send a PUCCH bundle 315-b which corresponds to DL data TTI bundle 310-b and which is transmitted according to resource offset 320-b. Resource offset 320-b may be based at least in part on the TTI bundling for the second UE 115. PUCCH bundle 315-b may use the same TTI bundling as DL control TTI bundle 305-b and DL data TTI bundle 310-b. However, in some examples the TTI bundling levels of the DL control TTI bundles 305, the DL data TTI bundles 310, and the PUCCH bundles 315 may be different.

Resource offset configuration 300 may also include communications between the wireless node and a third UE 115 (not shown). The third UE 115 may not use TTI bundling. Thus, DL control TTI bundle 305-c may include a single version of a subframe conveying control information. Accordingly, DL data TTI bundle 310-c may include a single version of a subframe conveying data. The third UE 115 may receive DL data TTI bundle 310-c and transmit PUCCH bundle 315-c in response. PUCCH bundle 315-c may be transmitted according to resource offset 320-c, which may be based on the TTI bundling for the third UE 115. Thus, the resource offsets 320 may be different for different UEs 115, and may be based on the coverage enhancements of the UEs 115.

The TTI bundling levels and resource offsets depicted in resource offset configuration 300 are examples of TTI bundling levels and resource offsets, but other configurations are also possible. Also, in some cases a wireless node may aggregate transmissions to groups of UEs 115 in either the time domain or the frequency domain. For example, a base station 105 may select a subset of the RBs available in the frequency domain for use by UEs 115 with one level of TTI bundling (and one resource offset) while dedicating another frequency region for use by another group of UEs 115 with a different TTI bundling level and, in some cases, a different resource offset. In another example, a wireless node may dedicate different time periods to transmissions to and from UEs 115 with a certain level of TTI bundling. In some cases, a single UE 115 may also be configured to use more than one level of TTI bundling or more than one resource offset.

Figure 4:
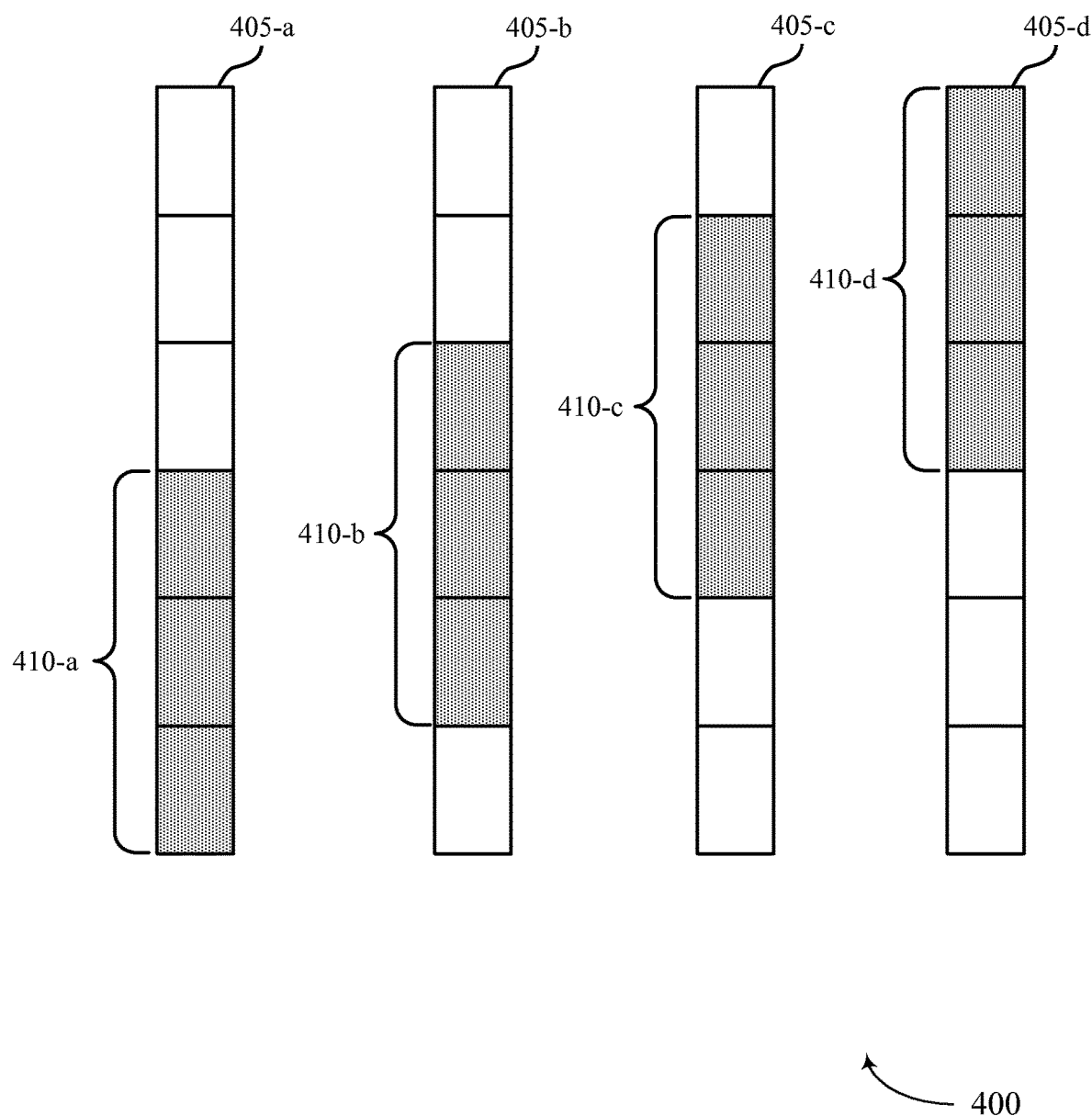
FIG. 4 illustrates an example of a resource block allocation for PUCCH with MTC devices in accordance with various aspects of the present disclosure.

FIG. 4 illustrates an example of resource block allocation 400 for PUCCH with MTC devices in accordance with various aspects of the present disclosure. Resource block allocation 400 may be used by a wireless device such as a UE 115 or a base station 105 described with reference to FIG. 1. For example, a base station 105 may allocate a number of resource blocks for use by a particular UE 115. The resource allocation may be done according to a predetermined or dynamic granularity (i.e., a minimum number of RBs assigned to a particular UE 115 during any given TTI). Although resource block allocation 400 is shown in terms of 3 RB granularity, the granularity of the allocation may be some other number of RBs (e.g., 1, 2, or 6).

Resource block allocation 400 may include four variations of an example resource group 405 which may include 6 RBs arranged contiguously in the frequency domain. Resource groups 405 may represent the middle six RBs of a carrier bandwidth. That is, in some cases, a UE 115 such as an MTC device may be configured to receive only resource group 405 from the RBs available in a cell. For a resource allocation granularity of 3 RBs, there may be four possible combinations of RB allocation (i.e., the allocation may be represented by 2 bits). In one example, RB set 410-a of resource group 405-a may be allocated for use by a UE 115. In an alternative option, the RB set 410-b of resource group 405-b may be allocated for the UE 115. Or, RB set 410-c of resource group 405-c may be allocated for use by the UE 115. An additional allocation option may be depicted by resource group 405-d, in which RB set 410-d is allocated for use by the UE 115. As another example, for a resource allocation granularity of 3 RBs, there may be three possible combinations of RB allocation (i.e., the allocation may be represented by 2 bits). The first combination can be depicted by RB set 410-*a,* the second combination can be depicted by resource group 405-*d,* while the third combination is the entire 6 RBs. In this example, the starting offset for a resource allocation is also a function of the resource allocation granularity. That is, a resource allocation can only start from RB0 or RB3. As another example, if an MTC device uses 2 RB allocation (not shown), there may be 5 possible combinations of resource allocation (i.e., 3 bits may be used to convey the resource allocation). As an example, the first combination can be the first 2 RBs, the second combination can be the second 2 RBs, the third combination can be the third 2 RBs, the fourth combination can be the first 4 RBs, while the fifth combination can be the entire 6 RBs. With 1 RB granularity, 5 bits may be used to convey the resource information.

Thus, resource allocation may be done according to various levels of granularity, which may correspond to the respective TTI bundling levels of the MTC devices. For example, an MTC device with a high TTI bundling level may use more resources in a subframe for the control/data channel. Thus, the transmission time may be reduced, which may reduce power consumption. In other words, MTC devices with higher TTI bundling levels may use coarser resource granularity than MTC devices with low TTI bundling levels (e.g., an MTC device without coverage enhancements may use a resource granularity of a single RB while an MTC device with high levels of coverage enhancements may use a resource granularity of 3 RBs or 6 RBs). If an MTC device uses 6 RB allocation, the scheduling node (e.g., the base station 105) may refrain from indicating the resource allocation in PDCCH, which may reduce the overall number of bits used to convey resource allocation. Additionally, such a scheme may allow a single PUCCH resource to convey the information.

In some examples, MTC devices with different TTI bundling levels may have different DCI formats, which may be due to different resources allocations granularity or different modulation coding scheme (MCS) sets. As an example, for a TTI bundling level of one (i.e., no TTI bundling), a 5-bit MCS information field may be used, which may indicate different combinations of modulation and coding schemes. The modulation may include QPSK, 16QAM, etc. The corresponding transport block size may be determined based at least in part on the MCS information field. For a TTI bundling level of larger than one, a 2-bit MCS information field may be used, which may indicate a different set of modulation and coding schemes. The modulation may be limited to QPSK only. Accordingly, a transport block size may also be determined based at least in part on the 2-bit MCS. In such cases, a smaller control size for MTC devices may improve coverage. In an alternative example, MTC devices with different coverage levels may be placed in different frequency or time locations. For instance, in a 5 MHz system there may be 4 blocks, each of 6 RBs. Each block may be dedicated to a specific set of MTC devices with the same coverage level. In another examples, a block of 6 RBs may be used for a set of MTC devices with a first coverage level, and then later used for a different set of MTC devices with a second coverage level.

In some cases, UEs 115 without coverage enhancements may use 1 RB allocation granularity, and UEs 115 such as MTC devices with coverage enhancements may use 3 RB resource allocation. In some cases there may be multiple levels of coverage enhancements (e.g., three levels associated with three levels of TTI bundling). Thus, the total number of PUCCH resources used for hybrid automatic repeat request (HARQ) resource signaling may depend on the number of blocks or the resource allocation granularity within each block.

In some cases, the granularity of the resource allocation may be based at least in part on the TTI bundling level of a UE 115. For example, UEs 115 with higher TTI bundling levels may be allocated resources according to coarser granularity than UEs 115 without coverage enhancements. For example, a high TTI bundling level UE 115 may use 6 RB allocation while a UE 115 without coverage enhancement may use single RB allocation. The granularity of resource allocation may affect the number of resources used for PUCCH (e.g., coarser resource allocation may reduce the amount of PUCCH resources used to convey assignments). For instance, when 3 RB granularity is used, a base station 105 may use two PUCCH resources.

Figure 5:
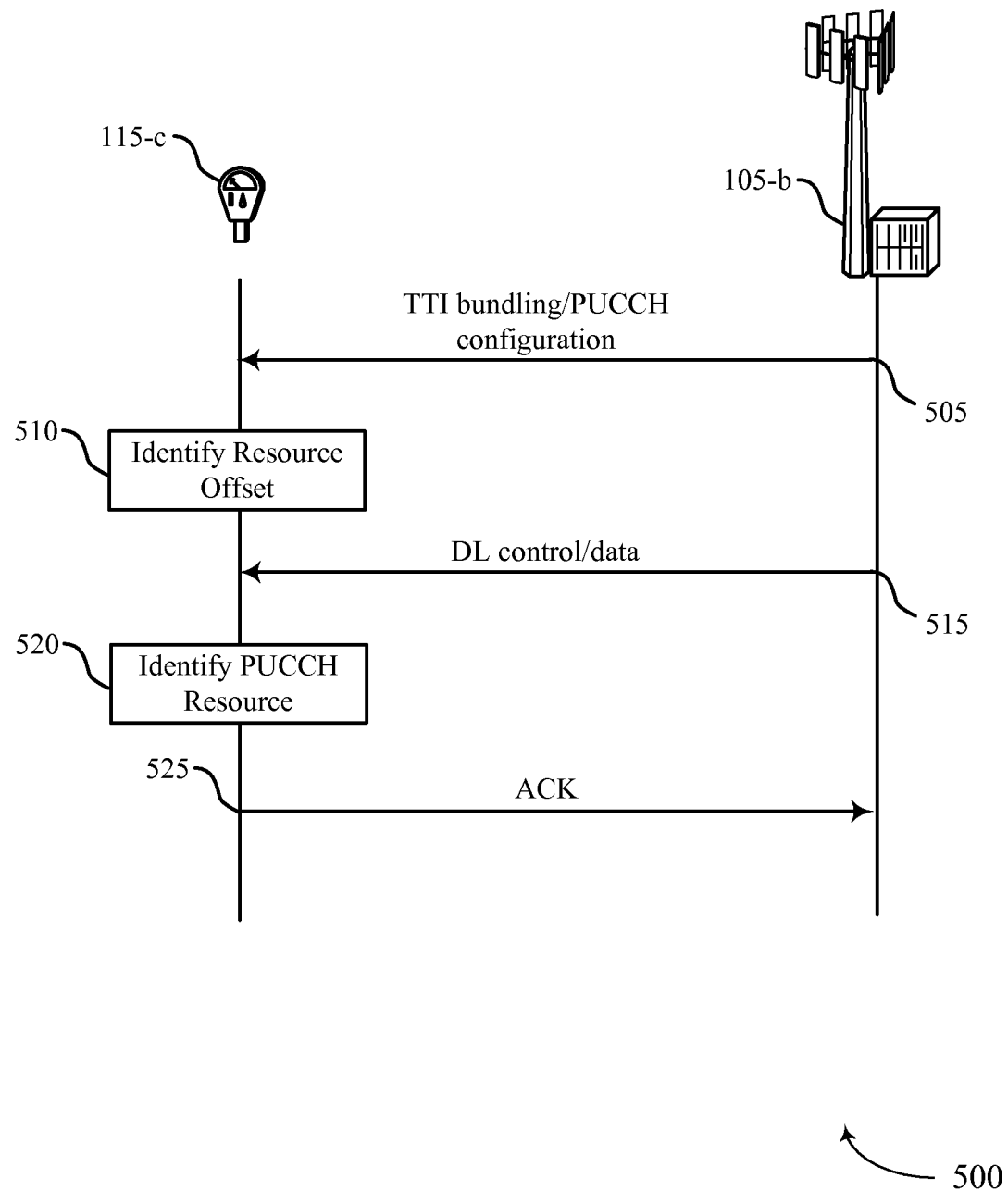
FIG. 5 illustrates an example of a process flow for PUCCH with MTC devices in accordance with various aspects of the present disclosure.

FIG. 5 illustrates an example of a process flow 500 for PUCCH with MTC devices in accordance with various aspects of the present disclosure. Process flow 500 may include a UE 115-*c,* which may be an example of a UE 115 described above with reference to FIGS. 1-2. In some cases, UE 115-*c* may be an MTC device. Process flow 500 may also include a base station 105-*b,* which may be an example of a base station 105 described above with reference to FIGS. 1-2.

At step 505, UE 115-*c* may identify a TTI bundling parameter. For example, base station 105-*b* may transmit a configuration message including the TTI bundling parameter. The configuration may also include (implicitly or explicitly) a resource offset for PUCCH transmissions.

At step 510, UE 115-*c* may identify a resource offset for PUCCH transmissions based on the TTI bundling parameter or the indication from base station 105-*b*.

At step 515, base station may transmit DL control information and data to UE 115-*c*. At step 520, UE 115-*c* may identify one or more resources for an UL control channel based at least in part on the TTI bundling parameter (and a resource index of the DL control or data transmission). In some examples identifying the one or more resources is based on an implicit resource allocation. In some examples the implicit resource allocation is based at least in part on a PDCCH (control) resource or a PDSCH (data) resource.

In some examples identifying the one or more resources is based at least in part on a correspondence between a set of frequency ranges of a carrier bandwidth of a serving cell and a set of TTI bundling parameters, wherein the set of TTI bundling parameters comprises the TTI bundling parameter of the UL control channel. In some cases, UE 115-*c* may determine a correspondence between a set of resource offsets and a set of TTI bundling parameters, wherein the set of TTI bundling parameters comprises the TTI bundling parameter of the UL control channel. In some examples identifying the one or more resources includes selecting a resource offset from the set of resource offsets based at least in part on the TTI bundling parameter and the correspondence.

At step 525, UE 115-*c* may transmit the UL control channel using the one or more resources. For example, UE 115-*c* may transmit an ACK or NACK indicating whether the DL data was successfully received at step 515. Base station 105-*b* may receive the UL control channel using the same resources.

In some cases UE 115-*c* may also identify a DCI format based at least in part on the TTI bundling parameter. In some examples the TTI bundling parameter corresponds to a resource allocation granularity level. In some examples the resource allocation granularity level is based on a minimum of a plurality of RBs, such that a DCI field indicating a set of resources for an UL control channel includes a number bits based on the resource allocation granularity level. In some examples the TTI bundling parameter corresponds to a modulation and coding scheme (MCS) information field, and the DCI format is based on the MCS information field.

As an example, UE 115-*c* may determine a first TTI bundling length, and then determine a first length of the MCS information field based on the first TTI bundling length.

The UE 115-*c* may then determine a second TTI bundling length, where the second TTI bundling length may be larger than the first TTI bundling length. UE 115-*c* may then determine a second length of the MCS information field based on the second TTI bundling length, where the second length of the MCS information field is smaller than the first length of the MCS information field.

Figure 6:
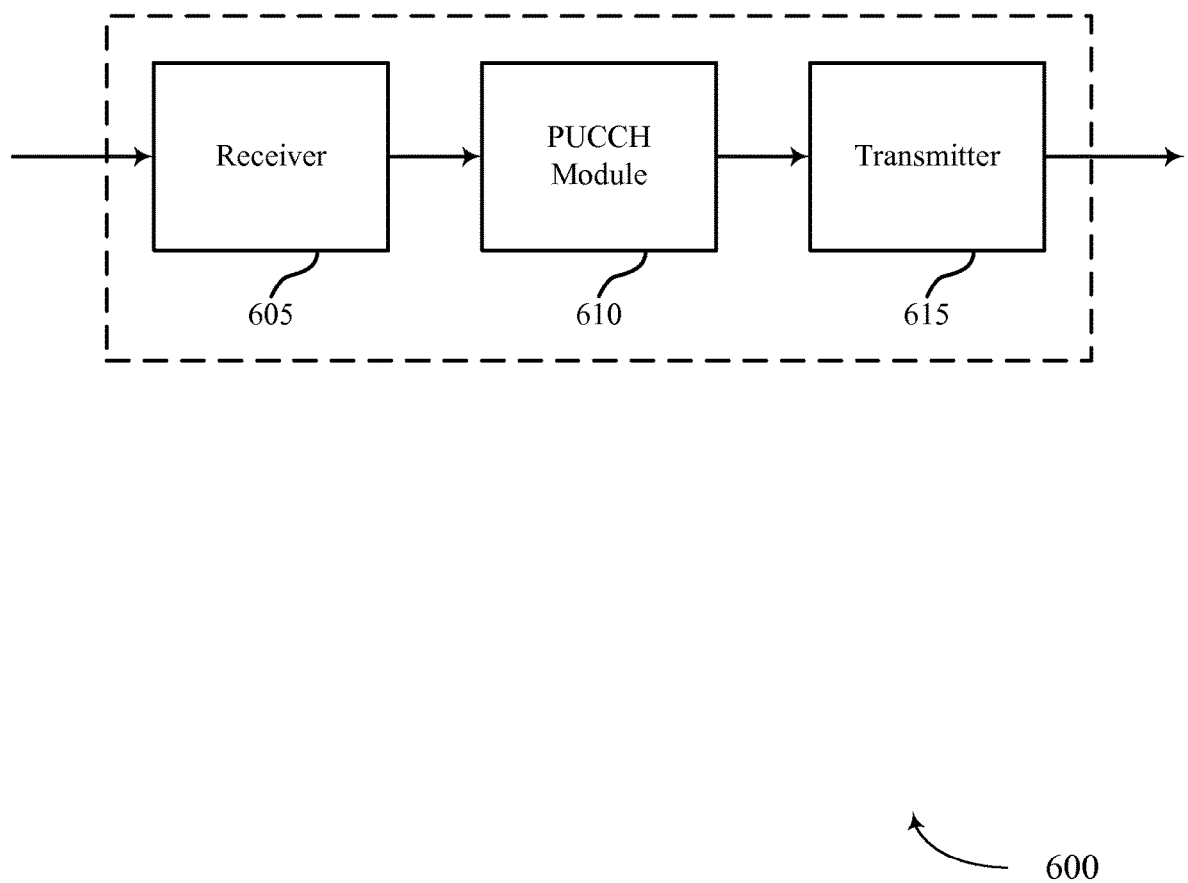
FIG. 6 shows a block diagram of a device configured for PUCCH with MTC devices in accordance with various aspects of the present disclosure.

FIG. 6 shows a block diagram of a wireless device 600 configured for PUCCH with MTC devices in accordance with various aspects of the present disclosure. Wireless device 600 may be an example of aspects of a UE 115 or a base station 105 described with reference to FIGS. 1-5. Wireless device 600 may include a receiver 605, a PUCCH module 610, or a transmitter 615. Wireless device 600 may also include a processor. Each of these components may be in communication with each other.

The components of wireless device 600 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 605 may receive information such as packets, user data, or control information associated with various information channels (e.g., control channels, data channels, and information related to PUCCH for MTC devices, etc.). Information may be passed on to the PUCCH module 610, and to other components of wireless device 600. In some examples, the receiver 605 may receive the UL control channel using the one or more resources (e.g., a base station 105 may receive PUCCH). In some examples, the receiver 605 may receive a configuration of a plurality of resources for the TTI bundling parameter (e.g., a UE 115 may receive the configuration in a DL control channel). In some examples, the receiver 605 may receive a resource indication in a DL control channel. In some examples, the receiver 605 may receive a DL control channel based at least in part on the DCI format.

The PUCCH module 610 may identify a TTI bundling parameter of an UL control channel, and identify one or more resources for an UL control channel based at least in part on the TTI bundling parameter. In some examples, identifying the one or more resources comprises receiving an indication of the one or more resources from a wireless node.

The transmitter 615 may transmit signals received from other components of wireless device 600. In some embodiments, the transmitter 615 may be collocated with the receiver 605 in a transceiver module. The transmitter 615 may include a single antenna, or it may include a plurality of antennas. In some examples, the transmitter 615 may transmit the UL control channel using the one or more resources (e.g., a UE 115 may transmit PUCCH). In some examples, the transmitter 615 may transmit a DL control channel based at least in part on the DCI format (e.g., a base station 105 may transmit PDCCH).

Figure 7:
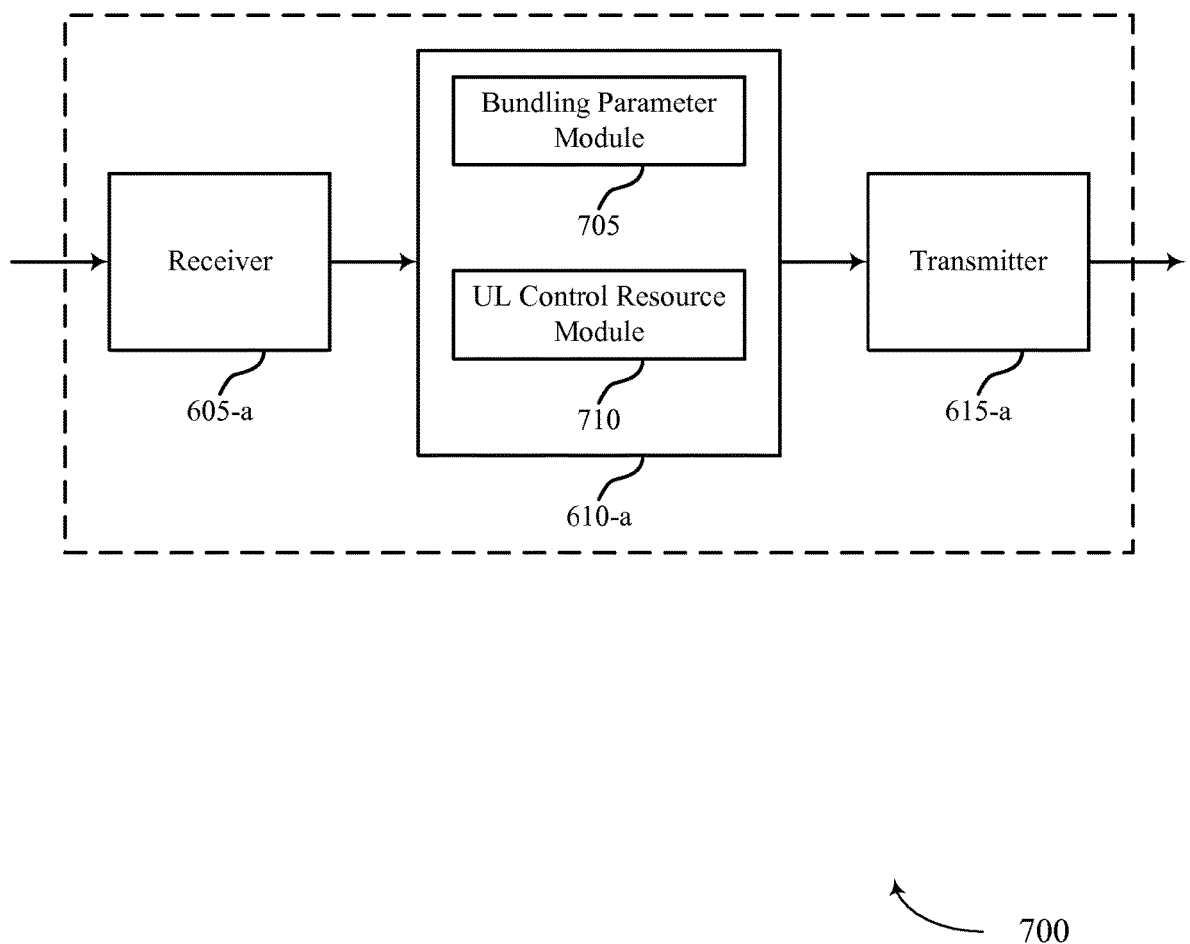
FIG. 7 shows a block diagram of a device configured for PUCCH with MTC devices in accordance with various aspects of the present disclosure.

FIG. 7 shows a block diagram of a wireless device 700 for PUCCH with MTC devices in accordance with various aspects of the present disclosure. Wireless device 700 may be an example of aspects of a wireless device 600 described with reference to FIGS. 1-6 (e.g., it may represent a UE 115 or a base station 105). Wireless device 700 may include a receiver 605-*a*, a PUCCH module 610-*a*, or a transmitter 615-*a*. Wireless device 700 may also include a processor. Each of these components may be in communication with each other. The PUCCH module 610-*a* may also include a bundling parameter module 705, and a UL control resource module 710.

The components of wireless device 700 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to PUCCH module 610-*a*, and to other components of wireless device 700. The PUCCH module 610-*a* may perform the operations described above with reference to FIG. 6. The transmitter 615-*a* may transmit signals received from other components of wireless device 700.

The bundling parameter module 705 may identify a TTI bundling parameter of an UL control channel as described above with reference to FIGS. 1-5. In some cases, the bundling parameter module 705 may determine a first TTI bundling length and a second TTI bundling length, where the second TTI bundling length is larger than the first TTI bundling length.

The UL control resource module 710 may identify one or more resources for an UL control channel based at least in part on the TTI bundling parameter as described above with reference to FIGS. 1-5.

Figure 8:
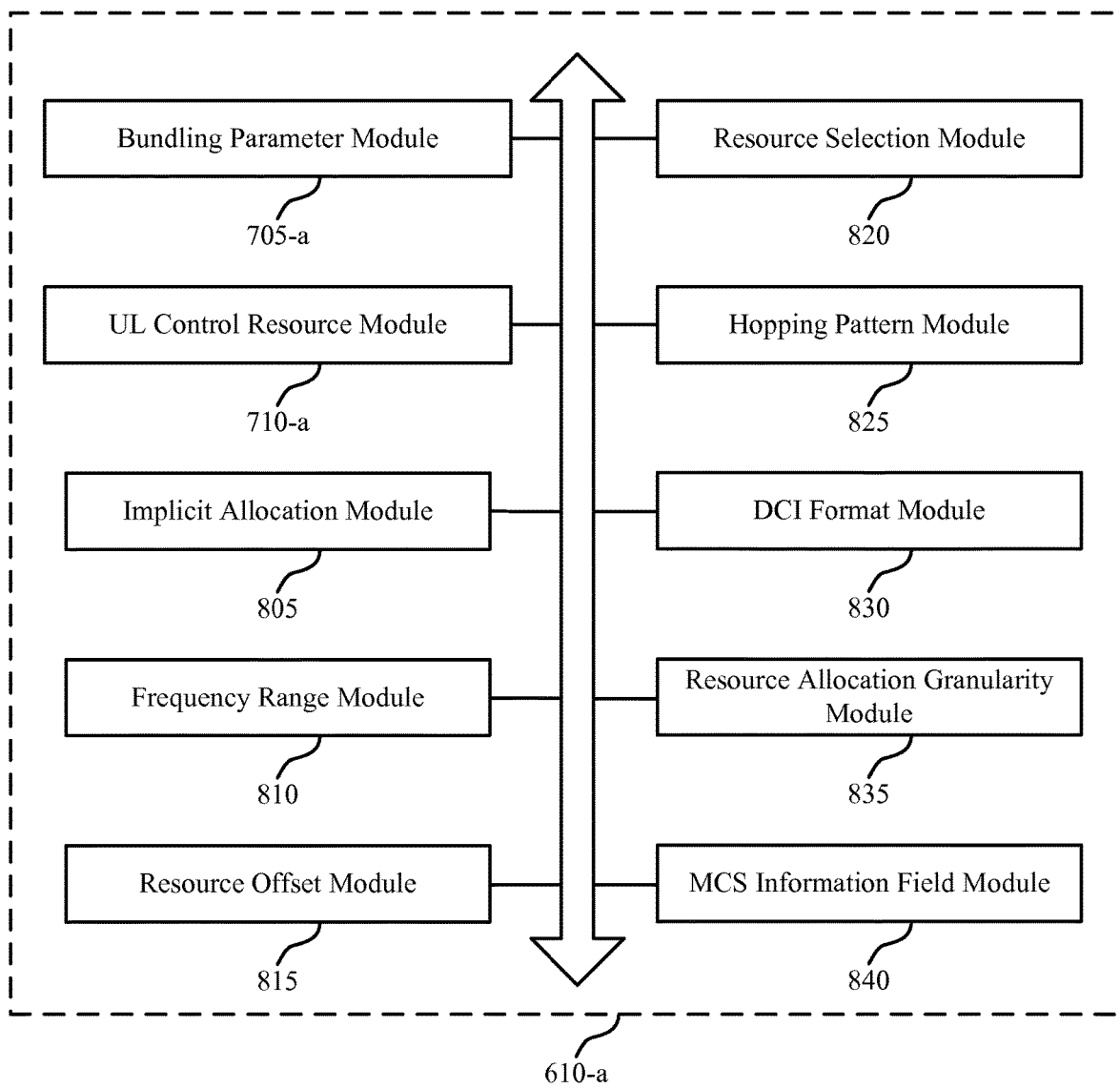
FIG. 8 shows a block diagram of a PUCCH module configured for PUCCH with MTC devices in accordance with various aspects of the present disclosure.

FIG. 8 shows a block diagram of a PUCCH module 610-*b* for PUCCH with MTC devices in accordance with various aspects of the present disclosure. The PUCCH module 610-*b* may be an example of aspects of a PUCCH module 610 described with reference to FIGS. 6-7. The PUCCH module 610-*b* may include a bundling parameter module 705-*a*, and a UL control resource module 710-*a*. Each of these modules may perform the functions described above with reference to FIG. 7. The PUCCH module 610-*b* may also include an implicit allocation module 805, a frequency range module 810, a resource offset module 815, a resource selection module 820, a hopping pattern module 825, a DCI format module 830, a resource allocation granularity module 835, and an MCS information field module 840.

The components of the PUCCH module 610-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The implicit allocation module 805 may be configured such that identifying the one or more resources may include identifying the one or more resources based on an implicit resource allocation as described above with reference to FIGS. 1-5. In some examples, the implicit resource allocation may be based at least in part on a PDCCH resource or a PDSCH resource.

The frequency range module 810 may be configured such that identifying the one or more resources may include identifying the one or more resources based at least in part on a correspondence between a set of frequency ranges of a carrier bandwidth of a serving cell and a set of TTI bundling parameters, wherein the set of TTI bundling parameters may include the TTI bundling parameter of the UL control channel as described above with reference to FIGS. 1-5.

The resource offset module 815 may determine a correspondence between a set of resource offsets and a set of TTI bundling parameters, wherein the set of TTI bundling parameters comprises the TTI bundling parameter of the UL control channel as described above with reference to FIGS. 1-5. In some examples, identifying the one or more resources comprises selecting a resource offset from the set of resource offsets based at least in part on the TTI bundling parameter and the correspondence. The resource offset module 815 may also receive a configuration indicating a resource offset corresponding to the TTI bundling parameter, wherein identifying the one or more resources is based on the resource offset.

The resource selection module 820 may identify one resource from the configured plurality of resources for the TTI bundling parameter based on the indication as described above with reference to FIGS. 1-5.

The hopping pattern module 825 may be configured such that identifying the one or more resources may include identifying a resource hopping pattern for a bundled transmission over a plurality of subframes in a resource block as described above with reference to FIGS. 1-5.

The DCI format module 830 may identify a DCI format based at least in part on the TTI bundling parameter as described above with reference to FIGS. 1-5.

The resource allocation granularity module 835 may be configured such that the TTI bundling parameter corresponds to a resource allocation granularity level, wherein the DCI format may be based at least in part on the resource allocation granularity level as described above with reference to FIGS. 1-5. In some examples, the resource allocation granularity level may be based on a minimum of a plurality of RBs, wherein a DCI field indicating a set of resources for an UL control channel comprises a number bits based on the resource allocation granularity level. In some examples, the resource allocation granularity level may be based on a minimum of 1 RB, wherein a DCI field indicating a set of resources for an UL control channel comprises a number of bits based on the resource allocation granularity level.

The MCS information field module 840 may determine a length of an MCS information field based on a TTI bundling length. The MCS information field module 840 may be configured such that the TTI bundling parameter corresponds to an MCS information field, wherein the DCI format may be based at least in part on the MCS information field as described above with reference to FIGS. 1-5. The MCS information field module 840 may also determine a second length of the MCS information field based on the second TTI bundling length, where the second length of the MCS information field is smaller than the first length of the MCS information field.

Figure 9:
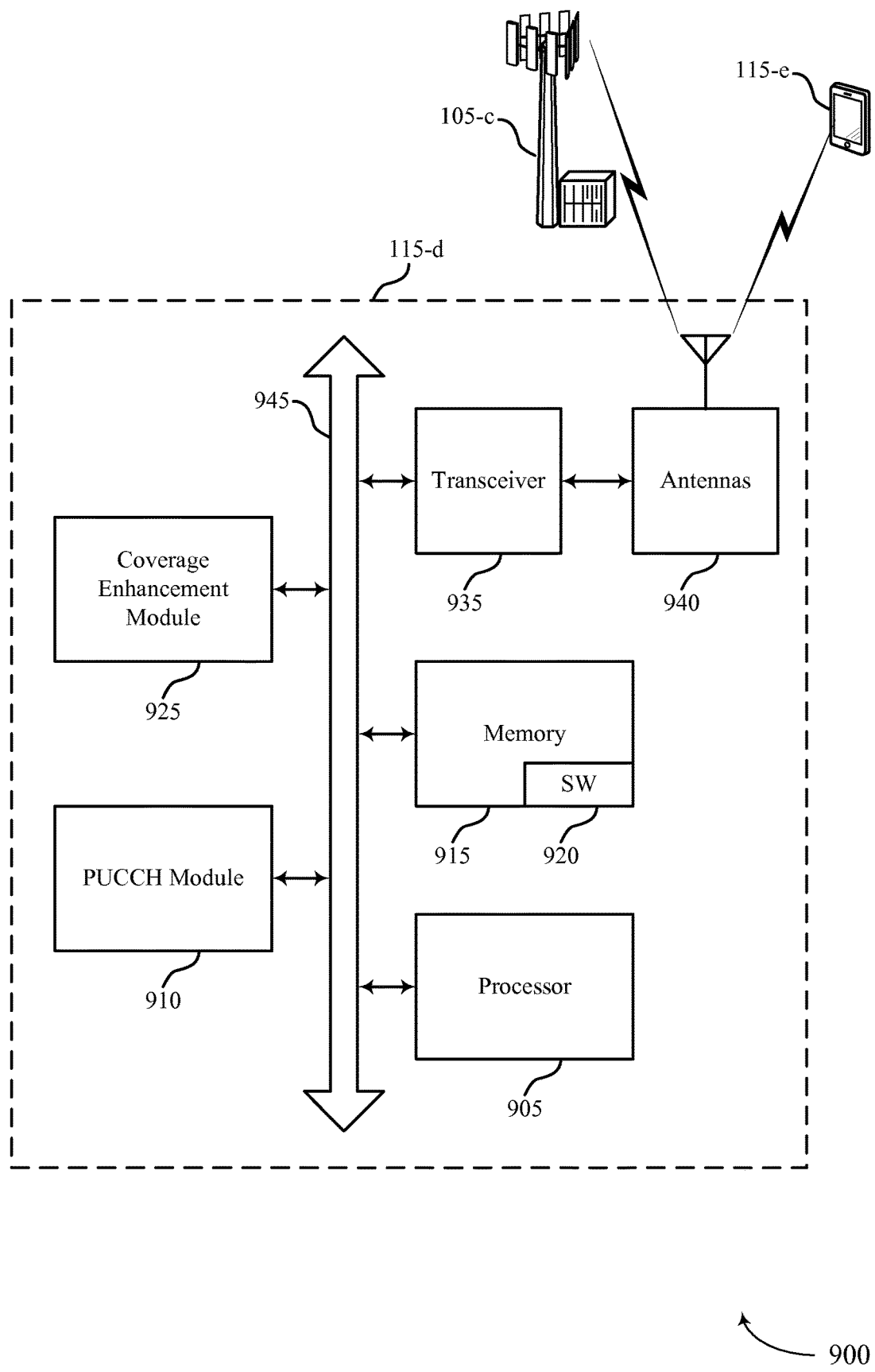
FIG. 9 illustrates a block diagram of a system including a device configured for PUCCH with MTC devices in accordance with various aspects of the present disclosure.

FIG. 9 shows a diagram of a system 900 including a UE 115 configured for PUCCH with MTC devices in accordance with various aspects of the present disclosure. System 900 may include UE 115-*d,* which may be an example of a UE 115, a wireless device 600 or a wireless device 700 described above with reference to FIGS. 1-8. UE 115-*d* may include a PUCCH module 910, which may be an example of a PUCCH module 610 described with reference to FIGS. 6-8. UE 115-*d* may also include a coverage enhancement module 925. UE 115-*d* may also include components for bi-directional voice and data communications including components for transmitting communications and components for receiving communications. For example, UE 115-*d* may communicate bi-directionally with UE 115-*e* or base station 105-*c.*

The coverage enhancement module 925 may be configured such that the TTI bundling parameter may be based at least in part on a coverage enhancement setting of the device as described above with reference to FIGS. 1-5. In some examples, the device may be an MTC device.

UE 115-*d* may also include a processor module 905, and memory 915 (including software (SW)) 920, a transceiver module 935, and one or more antenna(s) 940, each of which may communicate, directly or indirectly, with one another (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-*d* may include a single antenna 940, UE 115-*d* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., PUCCH for MTC devices, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU), a microcontroller, an ASIC, etc.)

Figure 10:
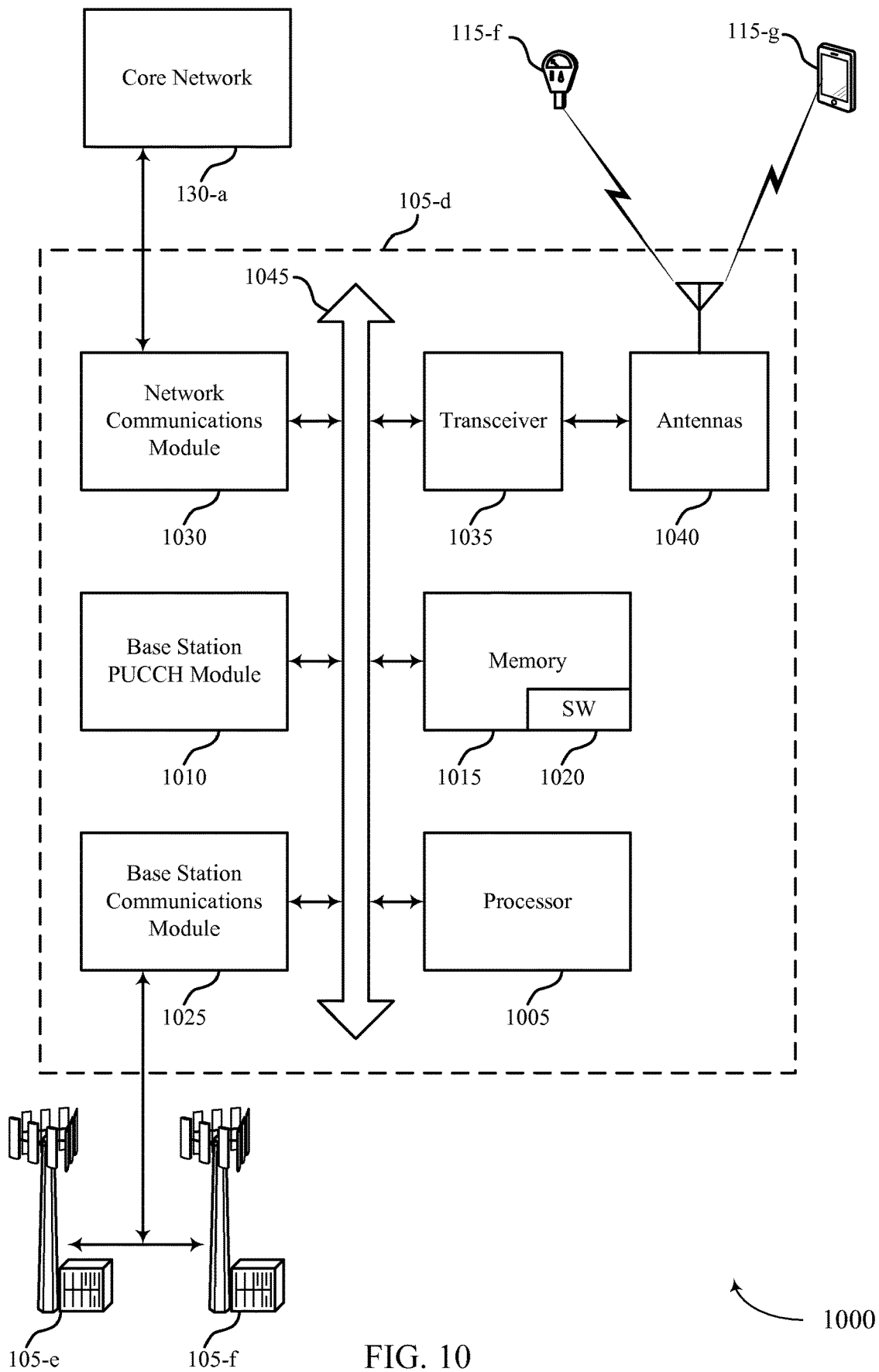
FIG. 10 illustrates a block diagram of a system including a base station configured for PUCCH with MTC devices in accordance with various aspects of the present disclosure.

FIG. 10 shows a diagram of a system 1000 including a base station 105 configured for PUCCH with MTC devices in accordance with various aspects of the present disclosure. System 1000 may include base station 105-*d,* which may be an example of a wireless device 600, a wireless device 700, or a base station 105 as described above with reference to FIGS. 1-8. Base station 105-*d* may include a base station PUCCH module 1010, which may be an example of a base station PUCCH module 1010 described with reference to FIGS. 7-9. Base station 105-*d* may also include components for bi-directional voice and data communications including components for transmitting communications and components for receiving communications. For example, base station 105-d may communicate bi-directionally with UE 115-f (which may be an MTC device) or UE 115-g.

In some cases, base station 105-d may have one or more wired backhaul links Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications module 1025. In some embodiments, base station communications module 1025 may provide an X2 interface within an LTE/LTE-A wireless communication network technology to provide communication between some of the base stations 105. In some embodiments, base station 105-d may communicate with other base stations through core network 130. In some cases, base station 105-d may communicate with the core network 130 through network communications module 1030.

The base station 105-d may include a processor module 1005, memory 1015 (including software (SW) 1020), transceiver modules 1035, and antenna(s) 1040, which each may be in communication, directly or indirectly, with one another (e.g., over bus system 1045). The transceiver modules 1035 may be configured to communicate bi-directionally, via the antenna(s) 1040, with the UEs 115, which may be multi-mode devices. The transceiver module 1035 (or other components of the base station 105-d) may also be configured to communicate bi-directionally, via the antennas 1040, with one or more other base stations (not shown). The transceiver module 1035 may include a modem configured to modulate the packets and provide the modulated packets to the antennas 1040 for transmission, and to demodulate packets received from the antennas 1040. Base station 105-d may include multiple transceiver modules 1035, each with one or more associated antennas 1040. The transceiver module may be an example of a combined receiver 605 and transmitter 615 of FIG. 6.

The memory 1015 may include RAM and ROM. The memory 1015 may also store computer-readable, computer-executable software code 1020 containing instructions that are configured to, when executed, cause the processor module 1010 to perform various functions described herein (e.g., PUCCH for MTC devices, selecting coverage enhancement techniques, call processing, database management, message routing, etc.). Alternatively, the software 1020 may not be directly executable by the processor module 1005 but be configured to cause the computer, e.g., when compiled and executed, to perform functions described herein. The processor module 1005 may include an intelligent hardware device, e.g., a CPU, a microcontroller, an ASIC, etc. The processor module 1005 may include various special purpose processors such as encoders, queue processing modules, base band processors, radio head controllers, digital signal processor (DSPs), and the like.

The base station communications module 1025 may manage communications with other base stations 105. The communications management module may include a controller or scheduler for controlling communications with UEs 115 in cooperation with other base stations 105. For example, the base station communications module 1025 may coordinate scheduling for transmissions to UEs 115 for various interference mitigation techniques such as beamforming or joint transmission.

Figure 11:
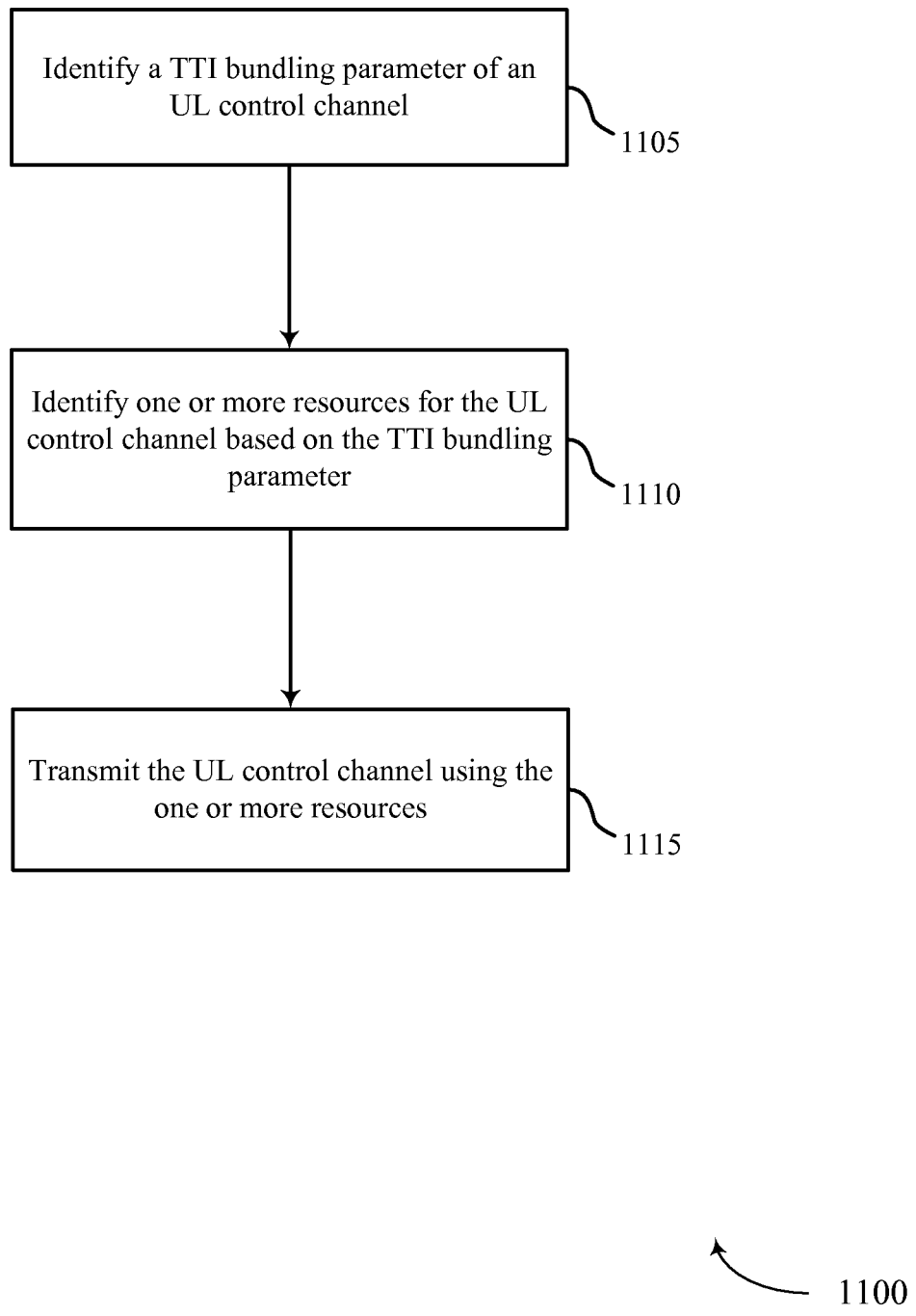
FIG. 11 shows a flowchart illustrating a method for PUCCH with MTC devices in accordance with various aspects of the present disclosure.

FIG. 11 shows a flowchart illustrating a method 1100 for PUCCH with MTC devices in accordance with various aspects of the present disclosure. The operations of method 1100 may be implemented by a wireless device (e.g., a UE 115, a wireless device 600, or a wireless device 700) or its components as described with reference to FIGS. 1-10. For example, the operations of method 1100 may be performed by the PUCCH module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware.

At block 1105, the wireless device may identify a TTI bundling parameter of an UL control channel as described above with reference to FIGS. 1-5. In certain examples, the operations of block 1105 may be performed by the bundling parameter module 705 as described above with reference to FIG. 7.

At block 1110, the wireless device may identify one or more resources for the UL control channel based at least in part on the TTI bundling parameter as described above with reference to FIGS. 1-5. In certain examples, the operations of block 1110 may be performed by the UL control resource module 710 as described above with reference to FIG. 7.

At block 1115, the wireless device may transmit the UL control channel using the one or more resources as described above with reference to FIGS. 1-5. In certain examples, the operations of block 1115 may be performed by the transmitter 615 as described above with reference to FIG. 6.

Figure 12:
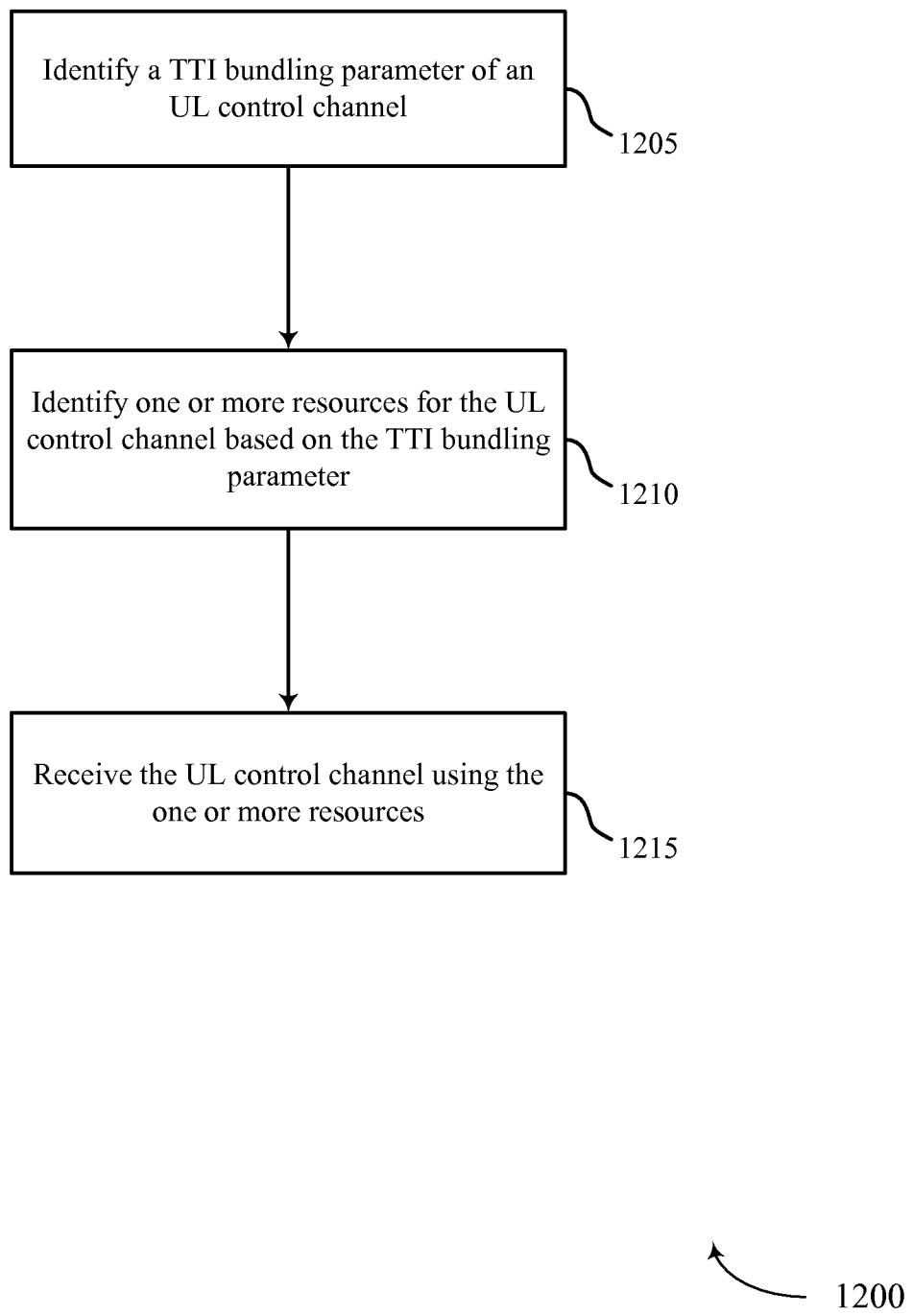
FIG. 12 shows a flowchart illustrating a method for PUCCH with MTC devices in accordance with various aspects of the present disclosure.

FIG. 12 shows a flowchart illustrating a method 1200 for PUCCH with MTC devices in accordance with various aspects of the present disclosure. The operations of method 1200 may be implemented by a wireless device (e.g., a base station 105, a wireless device 600, or a wireless device 700) or its components as described with reference to FIGS. 1-10. For example, the operations of method 1200 may be performed by the PUCCH module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1200 may also incorporate aspects of method 1100 of FIG. 11.

At block 1205, the wireless device may identify a TTI bundling parameter of an UL control channel as described above with reference to FIGS. 1-5. In certain examples, the operations of block 1205 may be performed by the bundling parameter module 705 as described above with reference to FIG. 7.

At block 1210, the wireless device may identify one or more resources for the UL control channel based at least in part on the TTI bundling parameter as described above with reference to FIGS. 1-5. In certain examples, the operations of block 1210 may be performed by the UL control resource module 710 as described above with reference to FIG. 7.

At block 1215, the wireless device may receive the UL control channel using the one or more resources as described above with reference to FIGS. 1-5. In certain examples, the operations of block 1215 may be performed by the receiver 605 as described above with reference to FIG. 6.

Figure 13:
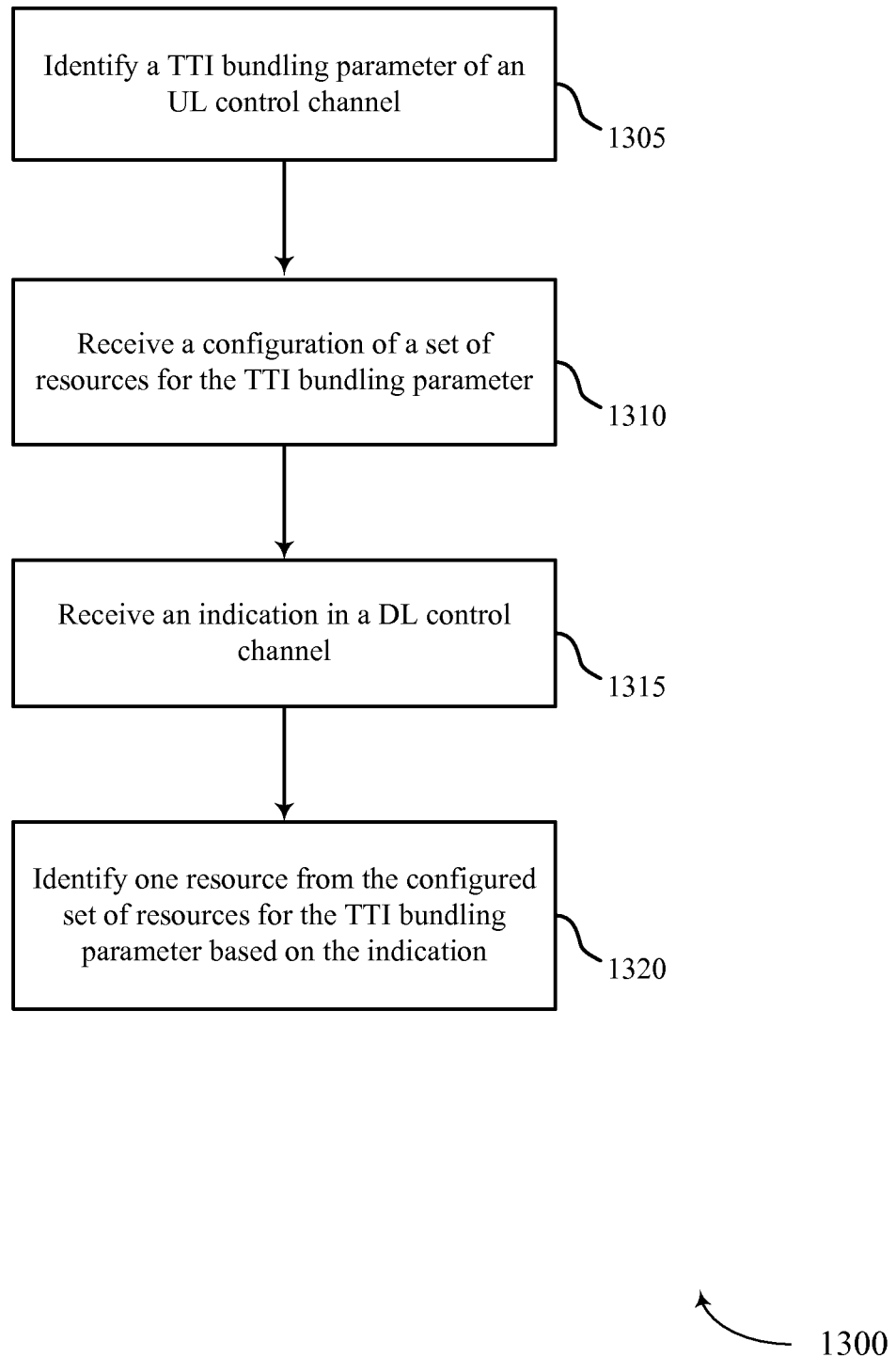
FIG. 13 shows a flowchart illustrating a method for PUCCH with MTC devices in accordance with various aspects of the present disclosure.

FIG. 13 shows a flowchart illustrating a method 1300 for PUCCH with MTC devices in accordance with various aspects of the present disclosure. The operations of method 1300 may be implemented by a wireless device (e.g., a UE 115, a wireless device 600 or a wireless device 700) or its components as described with reference to FIGS. 1-10. For example, the operations of method 1300 may be performed by the PUCCH module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1300 may also incorporate aspects of methods 1100 and 1200 of FIGS. 11-12.

At block 1305, the wireless device may identify a TTI bundling parameter of an UL control channel as described above with reference to FIGS. 1-5. In certain examples, the operations of block 1305 may be performed by the bundling parameter module 705 as described above with reference to FIG. 7.

At block 1310, the wireless device may identify one or more resources for the UL control channel based at least in part on the TTI bundling parameter as described above with reference to FIGS. 1-5. For example, the wireless device may receive a configuration of a plurality of resources for the TTI bundling parameter as described above with reference to FIGS. 1-5. In certain examples, the operations of block 1310 may be performed by the receiver 605 as described above with reference to FIG. 6.

At block 1315, the wireless device may receive an indication in a DL control channel as described above with reference to FIGS. 1-5. In certain examples, the operations of block 1315 may be performed by the receiver 605 as described above with reference to FIG. 6.

At block 1320, the wireless device may identify one resource from the configured plurality of resources for the TTI bundling parameter based on the indication as described above with reference to FIGS. 1-5. In certain examples, the operations of block 1320 may be performed by the resource selection module 820 as described above with reference to FIG. 8.

Figure 14:
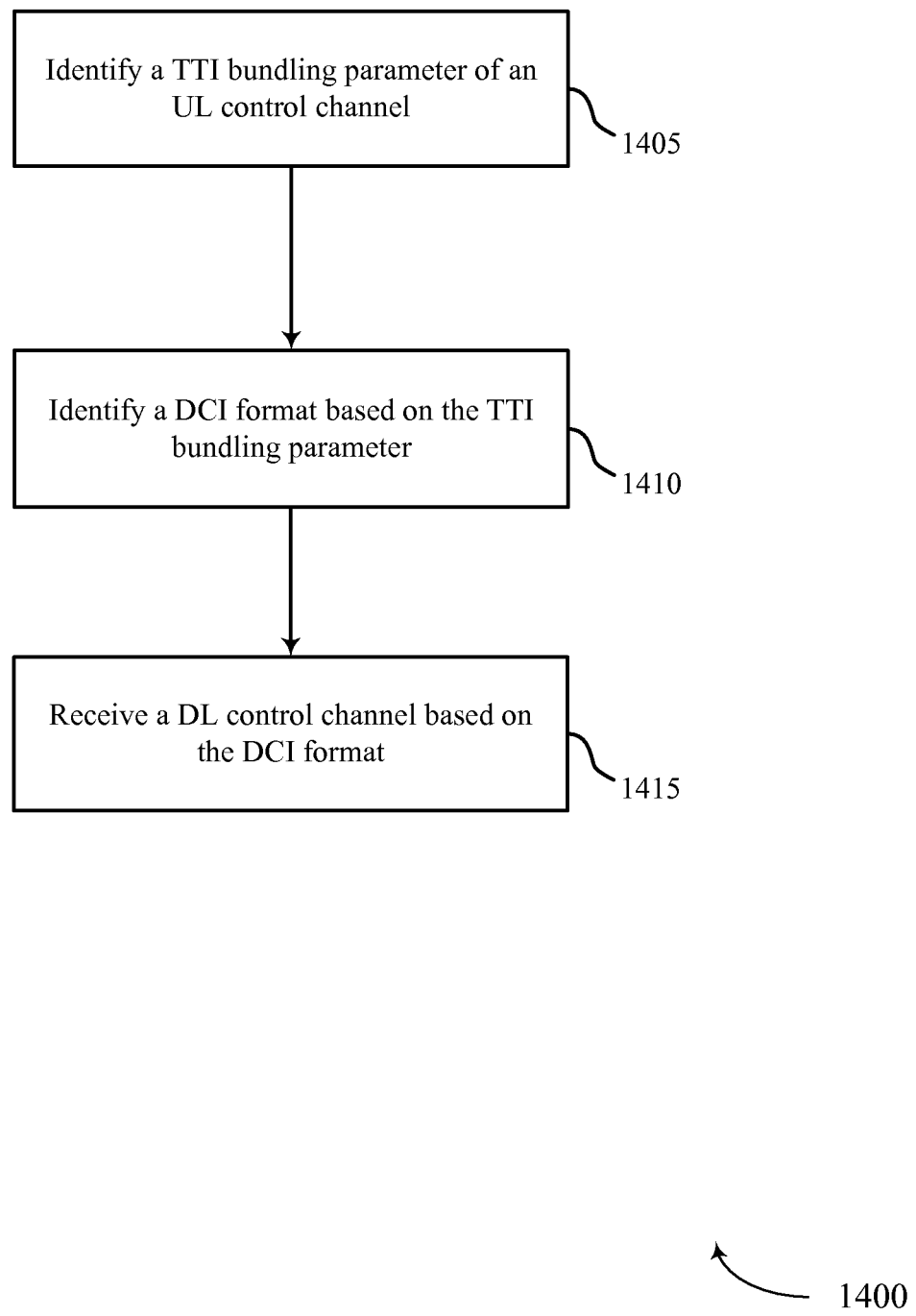
FIG. 14 shows a flowchart illustrating a method for PUCCH with MTC devices in accordance with various aspects of the present disclosure.

FIG. 14 shows a flowchart illustrating a method 1400 for PUCCH with MTC devices in accordance with various aspects of the present disclosure. The operations of method 1400 may be implemented by a wireless device (e.g., a UE 115, a wireless device 600 or a wireless device 700) or its components as described with reference to FIGS. 1-10. For example, the operations of method 1400 may be performed by the PUCCH module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1400 may also incorporate aspects of methods 1100, 1200, and 1300 of FIGS. 11-13.

At block 1405, the wireless device may identify a TTI bundling parameter of an UL control channel as described above with reference to FIGS. 1-5. In certain examples, the operations of block 1405 may be performed by the bundling parameter module 705 as described above with reference to FIG. 7.

At block 1410, the wireless device may identify a DCI format based at least in part on the TTI bundling parameter as described above with reference to FIGS. 1-5. In certain examples, the operations of block 1410 may be performed by the DCI format module 830 as described above with reference to FIG. 8.

At block 1415, the wireless device may receive a DL control channel based at least in part on the DCI format as described above with reference to FIGS. 1-5. In certain examples, the operations of block 1415 may be performed by the receiver 605 as described above with reference to FIG. 6.

Figure 15:
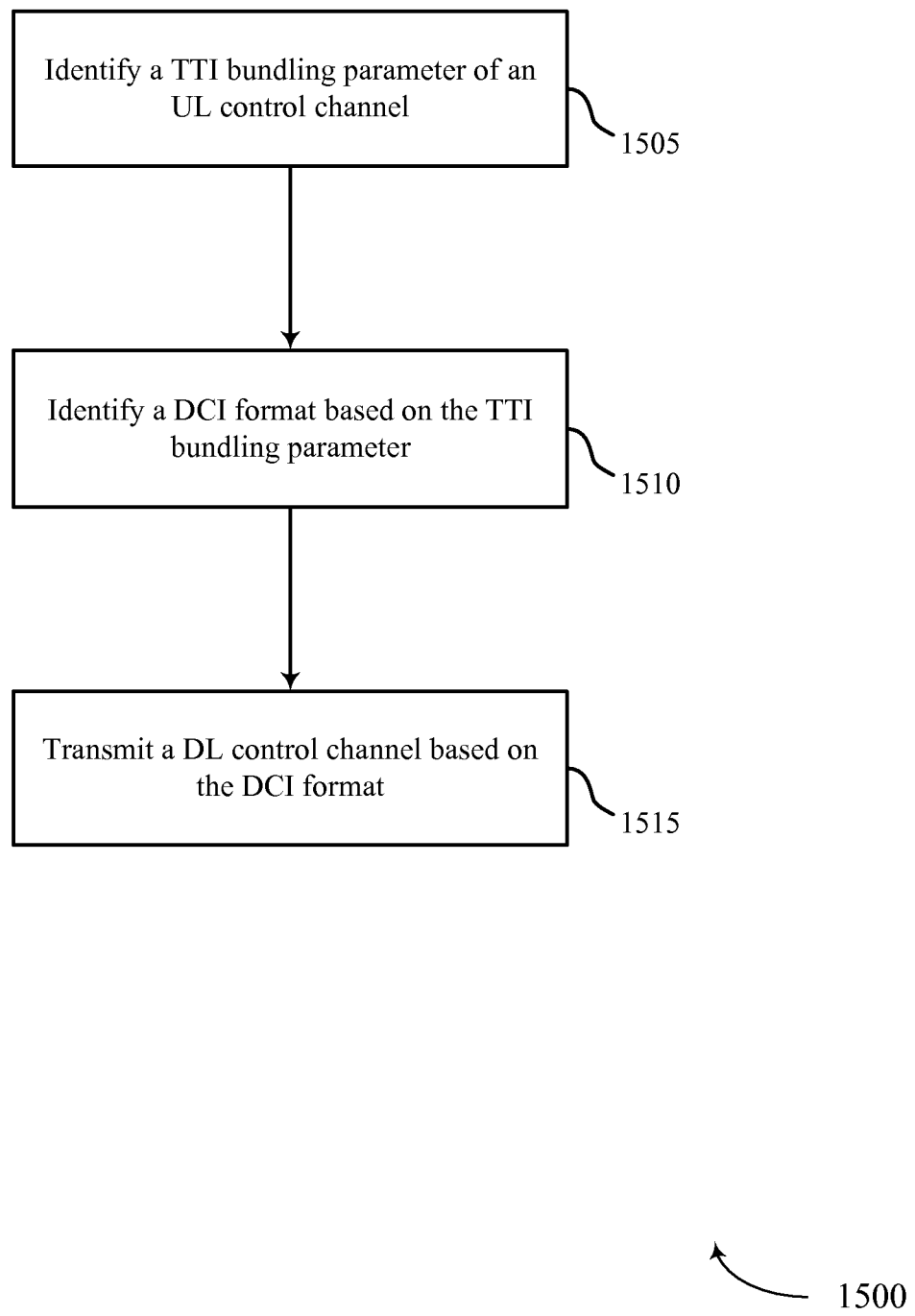
FIG. 15 shows a flowchart illustrating a method for PUCCH with MTC devices in accordance with various aspects of the present disclosure.

FIG. 15 shows a flowchart illustrating a method 1500 for PUCCH with MTC devices in accordance with various aspects of the present disclosure. The operations of method 1500 may be implemented by a wireless device (e.g., a base station 105, a wireless device 600, or a wireless device 700) or its components as described with reference to FIGS. 1-10. For example, the operations of method 1500 may be performed by the PUCCH module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1500 may also incorporate aspects of methods 1100, 1200, 1300, and 1400 of FIGS. 11-14.

At block 1505, the wireless device may identify a TTI bundling parameter of an UL control channel as described above with reference to FIGS. 1-5. In certain examples, the operations of block 1505 may be performed by the bundling parameter module 705 as described above with reference to FIG. 7.

At block 1510, the wireless device may identify a DCI format based at least in part on the TTI bundling parameter as described above with reference to FIGS. 1-5. In certain examples, the operations of block 1510 may be performed by the DCI format module 830 as described above with reference to FIG. 8.

At block 1515, the wireless device may transmit a DL control channel based at least in part on the DCI format as described above with reference to FIGS. 1-5. In certain examples, the operations of block 1515 may be performed by the transmitter 615 as described above with reference to FIG. 6.

Figure 16:
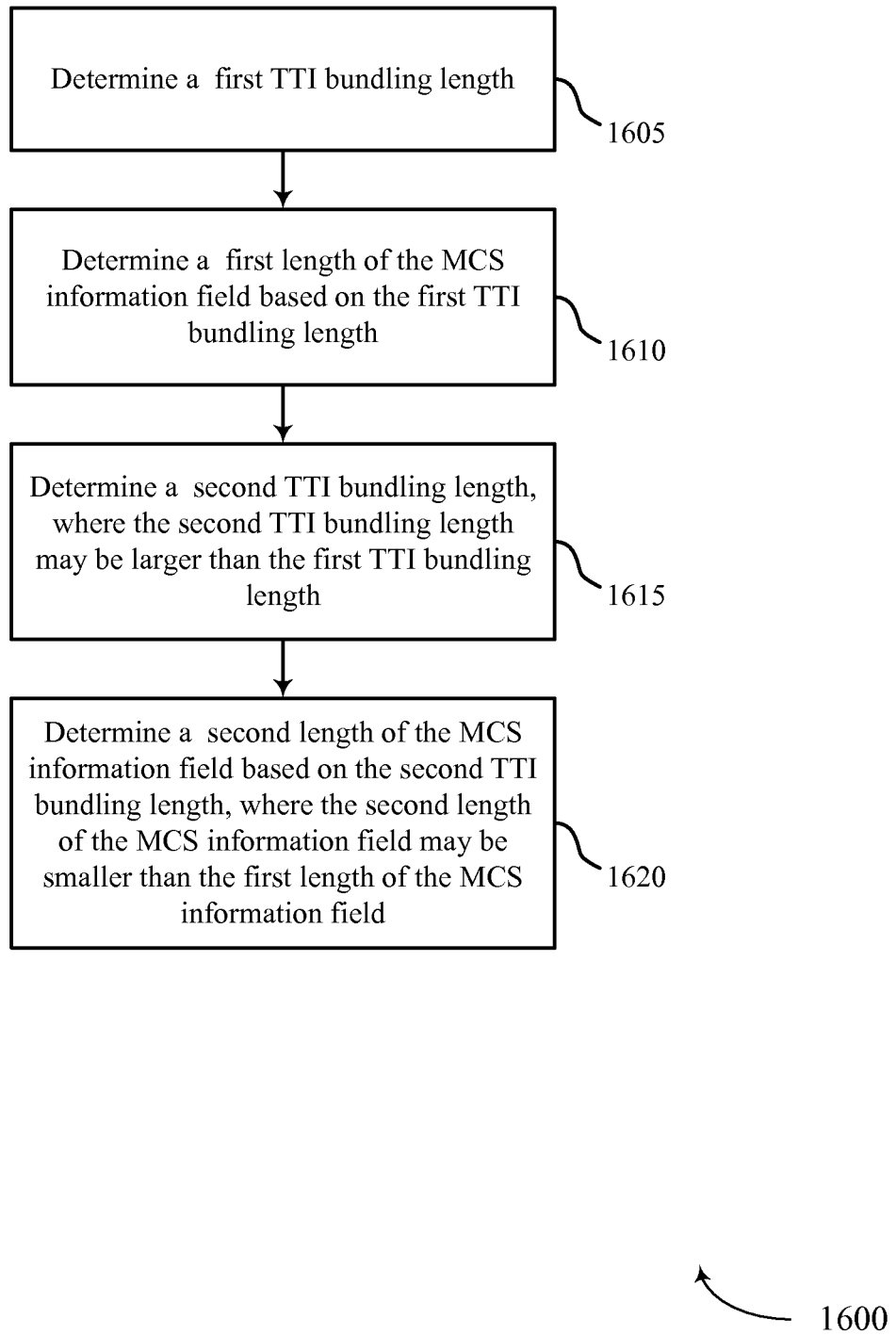
FIG. 16 shows a flowchart illustrating a method for PUCCH with MTC devices in accordance with various aspects of the present disclosure.

FIG. 16 shows a flowchart illustrating a method 1600 for PUCCH with MTC devices in accordance with various aspects of the present disclosure. The operations of method 1600 may be implemented by a wireless device (e.g., a UE 115, a wireless device 600, or a wireless device 700) or its components as described with reference to FIGS. 1-10. For example, the operations of method 1600 may be performed by the PUCCH module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1600 may also incorporate aspects of methods 1100, 1200, 1300, 1400, and 1500 of FIGS. 11-15.

At block 1605, the wireless device may identify a TTI bundling parameter of an UL control channel as described above with reference to FIGS. 1-5. The TTI bundling parameter may correspond to an MCS information field, wherein the DCI format is based at least in part on the MCS information field. For example, the wireless device may determine a first TTI bundling length. In certain examples, the operations of block 1605 may be performed by the bundling parameter module 705 as described above with reference to FIG. 7.

At block 1610, the wireless device may identify a DCI format based at least in part on the TTI bundling parameter as described above with reference to FIGS. 1-5. For example, the wireless device may determine a first length of the MCS information field based on the first TTI bundling length as described above with reference to FIGS. 1-5. In certain examples, the operations of block 1610 may be performed by the MCS information field module 840 as described above with reference to FIG. 8.

At block 1615, the wireless device may determine a second TTI bundling length, where the second TTI bundling length is larger than the first TTI bundling length as described above with reference to FIGS. 1-5. In certain examples, the operations of block 1615 may be performed by the bundling parameter module 705 as described above with reference to FIG. 7.

At block 1620, the wireless device may determine a second length of the MCS information field based on the second TTI bundling length, where the second length of the MCS information field is smaller than the first length of the MCS information field as described above with reference to FIGS. 1-5. In certain examples, the operations of block 1620 may be performed by the MCS information field module 840 as described above with reference to FIG. 8.

Thus, methods 1100, 1200, 1300, 1400, 1500, and 1600 may provide for PUCCH with MTC devices. It should be noted that methods 1100, 1200, 1300, 1400, 1500, and 1600 describe possible implementations, and that the operations and the steps may be rearranged or otherwise modified such that other implementations are possible. In some examples, aspects from two or more of the methods 1100, 1200, 1300, 1400, 1500, and 1600 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving an indication of a coverage enhancement (CE) level for the UE;
   identifying, based at least in part on the indication, one downlink control information (DCI) format of a plurality of DCI formats, the plurality of DCI formats comprising:
     a first DCI format corresponding to a first CE level, wherein the first DCI format indicates a first configuration for conveying DCI and comprises a first resource allocation field that has a first length,
     a second DCI format corresponding to a second CE level, wherein the second DCI format indicates a different configuration for conveying DCI than the first DCI format and comprises a second resource allocation field that has a second length that is different than the first length, and
     a third DCI format corresponding to a third CE level, wherein the third CE level indicates a lack of coverage enhancements, and wherein the third DCI format indicates a third configuration for conveying DCI and comprises a third resource allocation field that has a third length; and
   receiving, on a downlink control channel, DCI comprising a resource allocation field according to the identified DCI format.

2. The method of claim 1, wherein the CE level corresponds to a resource allocation granularity level, and wherein the identified DCI format is based at least in part on the resource allocation granularity level.

3. The method of claim 1, wherein the CE level corresponds to a modulation and coding scheme (MCS) information field, and wherein the identified DCI format is based at least in part on the MCS information field.

4. The method of claim 1, further comprising:
   determining a first transmission time interval (TTI) bundling length;
   determining a first length of a first MCS information field of the first DCI format based on the first TTI bundling length;
   determining a second TTI bundling length, where the second TTI bundling length is larger than the first TTI bundling length; and
   determining a second length of a second MCS information field of the second DCI format based on the second TTI bundling length, where the second length of the second MCS information field is smaller than the first length of the first MCS information field.

5. The method of claim 1, wherein the CE level comprises a transmission time interval (TTI) bundling level.

6. The method of claim 1, further comprising:
   determining a correspondence between the first DCI format and the first CE level and the second DCI format and the second CE level, wherein the one of the first DCI format or the second DCI format is identified based at least in part on the correspondence.

7. The method of claim 1, further comprising:
   configuring, at the UE, the first CE level based at least in part on the indication of the CE level for the UE, wherein the first DCI format is identified based at least in part on the first CE level being configured at the UE, and wherein DCI comprising the resource allocation field of the first length is received according to the first DCI format based at least in part on the identifying.

8. The method of claim 1, wherein the identifying comprises:
   identifying the first DCI format when the indication of the CE level for the UE indicates the first CE level, wherein DCI comprising the resource allocation field of the first length is received according to the first DCI format based at least in part on identifying the first DCI format; or
   identifying the second DCI format when the indication of the CE level for the UE indicates the second CE level, wherein DCI comprising the resource allocation field of the second length is received according to the second DCI format based at least in part on identifying the second DCI format.

9. The method of claim 1, wherein:
   the first CE level corresponds to a first resource allocation granularity level, and wherein the first resource allocation field of the first DCI format comprises a first number of bits to indicate a first resource allocation based at least in part on the first resource allocation granularity level, and
   the second CE level corresponds to a second resource allocation granularity level, and wherein the second resource allocation field of the second DCI format comprises a second number of bits that is less than the first number of bits to indicate a second resource allocation based at least in part on the second resource allocation granularity level.

10. An apparatus for wireless communication at a user equipment (UE), comprising:
    a processor;
    memory in coupled with the processor; and
    instructions stored in the memory; wherein the instructions are executable by the processor to:

receive an indication of a coverage enhancement (CE) level for the UE;
identify, based at least in part on the indication, one downlink control information (DCI) format of a plurality of DCI formats, the plurality of DCI formats comprising:
a first DCI format corresponding to a first CE level, wherein the first DCI format indicates a first configuration for conveying DCI and comprises a first resource allocation field that has a first length,
a second DCI format corresponding to a second CE level, wherein the second DCI format indicates a different configuration for conveying DCI than the first DCI format and comprises a second resource allocation field that has a second length that is different than the first length, and
a third DCI format corresponding to a third CE level, wherein the third CE level indicates a lack of coverage enhancements, and wherein the third DCI format indicates a third configuration for conveying DC and comprises a third resource allocation field that has a third length; and
receive, on a downlink control channel, DCI comprising a resource allocation field according to the identified DCI format.

11. The apparatus of claim 10, wherein the CE level corresponds to a resource allocation granularity level, and wherein the identified DCI format is based at least in part on the resource allocation granularity level.

12. The apparatus of claim 10, wherein the CE level corresponds to a modulation and coding scheme (MCS) information field, and wherein the identified DCI format is based at least in part on the MCS information field.

13. The apparatus of claim 10, wherein the instructions are executable by the processor to:
determine a first transmission time interval (TTI) bundling length;
determine a first length of a first MCS information field of the first DCI format based on the first TTI bundling length;
determine a second TTI bundling length, where the second TTI bundling length is larger than the first TTI bundling length; and
determine a second length of a second MCS information field of the second DCI format based on the second TTI bundling length, where the second length of the second MCS information field is smaller than the first length of the first MCS information field.

14. The apparatus of claim 10, wherein the CE level comprises a transmission time interval (TTI) bundling level.

15. The apparatus of claim 10, wherein the instructions are executable by the processor to:
determine a correspondence between the first DCI format and the first CE level and the second DCI format and the second CE level, wherein the one of the first DCI format or the second DCI format is identified based at least in part on the correspondence.

16. The apparatus of claim 10, wherein the instructions for identifying one of the first DCI format or the second DCI format are executable by the processor to:
identify the first DCI format when the indication of the CE level for the UE indicates the first CE level, wherein DCI comprising the resource allocation field of the first length is received according to the first DCI format based at least in part on identifying the first DCI format; or
identify the second DCI format when the indication of the CE level for the UE indicates the second CE level, wherein DCI comprising the resource allocation field of the second length is received according to the second DCI format based at least in part on identifying the second DCI format.

17. The apparatus of claim 10, wherein:
the first CE level corresponds to a first resource allocation granularity level, and wherein the first resource allocation field of the first DCI format comprises a first number of bits to indicate a first resource allocation based at least in part on the first resource allocation granularity level, and
the second CE level corresponds to a second resource allocation granularity level, and wherein the second resource allocation field of the second DCI format comprises a second number of bits that is less than the first number of bits to indicate a second resource allocation based at least in part on the second resource allocation granularity level.

18. An apparatus at a user equipment (UE), comprising:
means for receiving an indication of a coverage enhancement (CE) level for the UE;
means for identifying, based at least in part on the indication, one downlink control information (DCI) format of a plurality of DCI formats, the plurality of DCI formats comprising:
a first DCI format corresponding to a first CE level, wherein the first DCI format indicates a first configuration for conveying DCI and comprises a first resource allocation field that has a first length,
a second DCI format corresponding to a second CE level, wherein the second DCI format indicates a different configuration for conveying DCI than the first DCI format and comprises a second resource allocation field that has a second length that is different than the first length, and
a third DCI format corresponding to a third CE level, wherein the third CE level indicates a lack of coverage enhancements, and wherein the third DCI format indicates a third configuration for conveying DCI and comprises a third resource allocation field that has a third length; and
means for receiving, on a downlink control channel, DCI comprising a resource allocation field according to the identified DCI format.

19. The apparatus of claim 18, wherein the CE level corresponds to a resource allocation granularity level, and wherein the identified DCI format is based at least in part on the resource allocation granularity level.

20. The apparatus of claim 18, wherein:
the first CE level corresponds to a first resource allocation granularity level, and wherein the resource allocation field of the first DCI format comprises a first number of bits to indicate a first resource allocation based at least in part on the first resource allocation granularity level, and
the second CE level corresponds to a second resource allocation granularity level, and wherein the resource allocation field of the second DCI format comprises a second number of bits that is less than the first number of bits to indicate a second resource allocation based at least in part on the second resource allocation granularity level.

21. The apparatus of claim 18, wherein the CE level corresponds to a modulation and coding scheme (MCS) information field, and wherein the identified DCI format is based at least in part on the MCS information field.

22. The apparatus of claim 18, further comprising:
   means for determining a first transmission time interval (TTI) bundling length;
   means for determining a first length of a first MCS information field of the first DCI format based on the first TTI bundling length;
   means for determining a second TTI bundling length, where the second TTI bundling length is larger than the first TTI bundling length; and
   means for determining a second length of a second MCS information field of the second DCI format based on the second TTI bundling length, where the second length of the second MCS information field is smaller than the first length of the first MCS information field.

23. The apparatus of claim 18, wherein the means for identifying comprises:
   means for identifying the first DCI format when the indication of the CE level for the UE indicates the first CE level, wherein DCI comprising the resource allocation field of the first length is received according to the first DCI format based at least in part on identifying the first DCI format; and
   means for identifying the second DCI format when the indication of the CE level for the UE indicates the second CE level, wherein DCI comprising the resource allocation field of the second length is received according to the second DCI format based at least in part on identifying the second DCI format.

24. A non-transitory computer-readable medium storing computer-executable code for wireless communication at a user equipment (UE), the code executable by a processor to:
   receive an indication of a coverage enhancement (CE) level for the UE;
   identify, based at least in part on the indication, one downlink control information (DCI) format of a plurality of DCI formats, the plurality of DCI formats comprising:
   a first DCI format corresponding to a first CE level, wherein the first DCI format indicates a first configuration for conveying DCI and comprises a first resource allocation field that has a first length,
   a second DCI format corresponding to a second CE level, wherein the second DCI format indicates a different configuration for conveying DCI than the first DCI format and comprises a second resource allocation field that has a second length that is different than the first length, and
   a third DCI format corresponding to a third CE level, wherein the third CE level indicates a lack of coverage enhancements, and wherein the third DCI format indicates a third configuration for conveying DCI, and comprises a third resource allocation field that has a third length; and
   receive, on a downlink control channel, DCI comprising a resource allocation field according to the identified DCI format.

25. The non-transitory computer-readable medium of claim 24, wherein the CE level corresponds to a resource allocation granularity level, and wherein the identified DCI format is based at least in part on the resource allocation granularity level.

26. The non-transitory computer-readable medium of claim 24, wherein:
   the first CE level corresponds to a first resource allocation granularity level, and wherein the resource allocation field of the first DCI format comprises a first number of bits to indicate a first resource allocation based at least in part on the first resource allocation granularity level, and
   the second CE level corresponds to a second resource allocation granularity level, and wherein the resource allocation field of the second DCI format comprises a second number of bits that is less than the first number of bits to indicate a second resource allocation based at least in part on the second resource allocation granularity level.

27. The non-transitory computer-readable medium of claim 24, wherein the CE level corresponds to a modulation and coding scheme (MCS) information field, and wherein the identified DCI format is based at least in part on the MCS information field.

28. The non-transitory computer-readable medium of claim 24, wherein the code is executable by the processor to:
   determine a first transmission time interval (TTI) bundling length;
   determine a first length of a first MCS information field of the first DCI format based on the first TTI bundling length;
   determine a second TTI bundling length, where the second TTI bundling length is larger than the first TTI bundling length; and
   determine a second length of a second MCS information field of the second DCI format based on the second TTI bundling length, where the second length of the second MCS information field is smaller than the first length of the first MCS information field.

* * * * *